(12) United States Patent
Torres et al.

(10) Patent No.: US 12,094,320 B2
(45) Date of Patent: Sep. 17, 2024

(54) FLOOD WARNING SYSTEM

(71) Applicant: J. M. Torres & Associates, LLC, College Station, TX (US)

(72) Inventors: Jacob M. Torres, College Station, TX (US); Evan S. Adrian, Rowlett, TX (US); Raymond C. Cook, Euless, TX (US)

(73) Assignee: J.M. Torres & Associates, LLC, College Station, TX (US)

( * ) Notice: Subject to any disclaimer, the term of this patent is extended or adjusted under 35 U.S.C. 154(b) by 0 days.

(21) Appl. No.: 17/702,787

(22) Filed: Mar. 24, 2022

(65) Prior Publication Data

US 2023/0177944 A1 Jun. 8, 2023

Related U.S. Application Data

(60) Provisional application No. 63/287,025, filed on Dec. 7, 2021.

(51) Int. Cl.
| | | |
|---|---|---|
| *G08B 21/20* | (2006.01) | |
| *G01F 23/80* | (2022.01) | |
| *G01W 1/06* | (2006.01) | |
| *G01W 1/14* | (2006.01) | |
| *G08B 21/18* | (2006.01) | |

(52) U.S. Cl.
CPC ............ *G08B 21/20* (2013.01); *G01F 23/80* (2022.01); *G01W 1/06* (2013.01); *G01W 1/14* (2013.01); *G08B 21/182* (2013.01)

(58) Field of Classification Search
CPC .... H04M 11/04; H04M 3/5116; H04W 76/50; G08B 21/20; G08B 21/182; G01F 23/80; G01W 1/06; G01W 1/14
See application file for complete search history.

(56) References Cited

U.S. PATENT DOCUMENTS

| | | | | |
|---|---|---|---|---|
| 6,313,744 | B1 * | 11/2001 | Capowski | G08B 25/14 340/517 |
| 6,321,876 | B1 * | 11/2001 | Kawai | B66B 5/022 187/391 |
| 10,068,473 | B1 * | 9/2018 | Harrison | G08G 1/0965 |
| 10,692,361 | B1 * | 6/2020 | Daly | G08B 27/005 |
| 2002/0073333 | A1 * | 6/2002 | Palka | H04L 41/06 709/224 |
| 2002/0174367 | A1 * | 11/2002 | Kimmel | G08B 13/19682 726/4 |

(Continued)

OTHER PUBLICATIONS

Tapco, Maryland Town Overhauls Safety During Frequent Floods, Case Study, 2020 (Year: 2020).*

*Primary Examiner* — Kyle R Quigley
(74) *Attorney, Agent, or Firm* — Mackey Law Firm PLLC

(57) ABSTRACT

A system for monitoring flooding can include a plurality of flood monitoring stations and at least one flood warning station in communication with each flood monitoring station. Each flood monitoring station can include at least one sensor configured to detect water level and a visual warning device to alert users of actual or predicted flooding. Each flood monitoring station can include a processor to determine a water level using the sensor and control the visual warning device. Each flood monitoring station can include a processor and a wireless communications device to communicate the water level to the flood warning station.

23 Claims, 19 Drawing Sheets

(56) References Cited

U.S. PATENT DOCUMENTS

| | | | |
|---|---|---|---|
| 2005/0024216 A1* | 2/2005 | Crooks | F24F 11/49 340/606 |
| 2006/0125655 A1* | 6/2006 | McMahon | G08G 1/096872 340/907 |
| 2010/0171640 A1* | 7/2010 | Delia | G08G 1/07 340/907 |
| 2010/0259418 A1* | 10/2010 | Jia | G08G 1/095 340/928 |
| 2011/0182668 A1* | 7/2011 | Hogan | G06Q 50/06 405/80 |
| 2012/0264393 A1* | 10/2012 | Pinhanez | H04L 67/12 340/602 |
| 2016/0180699 A1* | 6/2016 | Côté | G08B 29/02 340/506 |
| 2017/0238129 A1* | 8/2017 | Maier | H04W 4/029 455/404.2 |
| 2019/0293837 A1* | 9/2019 | Smyth | G01W 1/02 |
| 2020/0080882 A1* | 3/2020 | Schnably | G08B 21/10 |
| 2021/0082574 A1* | 3/2021 | Alejo | H04W 4/08 |
| 2021/0108955 A1* | 4/2021 | Helmuth | G01F 23/18 |
| 2022/0101720 A1* | 3/2022 | Huang | G08G 1/0129 |

\* cited by examiner

CONTROL PANEL

USERS CURRENTLY LOGGED IN

| NAME | STATUS |
|---|---|
| USER 1 | ○ |
| USER 2 | ○ |
| USER 3 | ○ |
| USER 4 | ○ |
| USER 5 | ○ |
| USER 6 | ○ |
| USER 7 | ○ |
| USER 8 | ⊗ |
| USER 9 | ○ |
| USER 10 | ○ |
| USER 11 | ○ |
| USER 12 | ○ |

PANEL OVERRIDES

| SENSOR NAME | SENSOR LOCATION | LOCATIONS STATUS RED SWITCH = RED MAP DOT GREEN SWITCH = GREEN MAP DOT | FLASHER POLES BLACK SWITCH = FLASHERS OFF ORANGE SWITCH = FLASHERS ON | FLASHER POLES TOTAL POLES | FLASHER POLE STATUS FLASHER POLE CONFIRMATION PROGRESS |
|---|---|---|---|---|---|
| SENSOR-001 | OLD RELIANCE RD @ CARTERS CREEK TRIB | ▨ | ☐ | 4 | ○○○○ |
| SENSOR-002 | MUMFORD RD @ STILL CREEK N OF BRUIN TRACE | ▨ | ☐ | 3 | ○○○ |
| SENSOR-003 | BROADMOOR DR @ BRIAR CREEK NEAR CITY COURSE | ▨ | ☐ | 3 | ○○○ |
| SENSOR-004 | BARAK LN @ OAK RIDGE DR | ▨ | ☐ | 0 | |
| SENSOR-005 | COPPERFIELD DR @ HUDSON CREEK IN PARK HUDSON | ▨ | ☐ | 0 | |
| SENSOR-006 | BOONEVILLE RD @ CARTERS CREEK | ▨ | ☐ | 0 | |
| SENSOR-007 | S COLLEGE AVE @ MUNICIPAL LAKE BURTON CREEK TRIB D | ▨ | ☐ | 0 | |
| SENSOR-008 | RICHARD ST @ COTTONWOOD BRANCH TRIB 5 | ▨ | ☐ | 0 | |
| SENSOR-009 | MUMFORD RD @ THOMPSONS BRANCH | ▨ | ☐ | 2 | ○○ |
| SENSOR-010 | E VILLA MARIA RD @ BURTON CREEK TRIB D | ▨ | ☐ | 3 | ○○○ |
| SENSOR-011 | W CARSON ST @ BURTON CREEK TRIB | ▨ | ☐ | 0 | |

FIG. 18

FLOOD WARNING SYSTEM

CROSS REFERENCE TO RELATED APPLICATIONS

This application claims the benefit of U.S. Provisional Patent Application No. 63/287,025 filed Dec. 7, 2021, the entire content of which is hereby incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to adverse weather detection and warning systems and more specifically relates to systems and methods for providing warnings of impending or actual flooding conditions.

Description of the Related Art

The United States Geological Survey currently monitors a variety of stream gauges throughout the United States. These stream gauges monitor various conditions, such as depth and flow rates. However, their placement and configuration is not necessarily well suited to monitoring or predicting flooding, such as the flooding of roadways, especially in rural communities and/or roadways outside of urban areas.

Flooding, in general, can be dangerous and disruptive. Roadway flooding is particularly dangerous when drivers do not appreciate the dangers and try to drive through floodwaters. Drivers may not realize a particular roadway is flooded, or about to flood, and therefore may become trapped, even where another roadway is clear. Thus, a flooded roadway can cause congestion even where alternative routes are available.

BRIEF SUMMARY OF THE INVENTION

Applicants have created new and useful devices, systems and methods for providing warnings of impending or actual flooding conditions.

In at least one embodiment, a method for monitoring flooding can include providing a plurality of flood monitoring stations, determining, at each flood monitoring station, a water level, communicating wirelessly, from each flood monitoring station to a flood warning station, a most recent water level determined by each flood monitoring station, and warning a user of flooding when one or more of the most recent water levels determined by each flood monitoring station exceeds a threshold.

In at least one embodiment, each flood monitoring station can include at least one pressure transducer or other sensor configured to detect water level. In at least one embodiment, each flood monitoring station can include at least one atmospheric pressure sensor. In at least one embodiment, each flood monitoring station can include at least one ambient temperature sensor. In at least one embodiment, determining the water level can be done using and/or otherwise in cooperation with at least one pressure transducer or other sensor configured to sense water level, at least one atmospheric pressure sensor, and/or at least one ambient temperature sensor.

In at least one embodiment, each flood monitoring station can include a relative humidity sensor and/or a rainfall sensor. In at least one embodiment, the water level can be determined at each flood monitoring station additionally using and/or otherwise in cooperation with at least one of a relative humidity sensor and a rainfall sensor located at each flood monitoring station. In at least one embodiment, the water level can be determined at each flood monitoring station only when one or more of a relative humidity sensor and a rainfall sensor indicate adverse weather. In at least one embodiment, one or more rainfall sensors can be used to determine water level.

In at least one embodiment, determining the water level can be done at one or more rates, such as a first periodic rate. In at least one embodiment, communicating the most recent water level can be done wirelessly at one or more rates, such as a second periodic rate. In at least one embodiment, the first periodic rate is the same as the second periodic rate. In at least one embodiment, the first periodic rate can be less than the second periodic rate. In at least one embodiment, the first periodic rate can be greater than the second periodic rate.

In at least one embodiment, warning the user of flooding can include communicating wirelessly a warning message to the user from the flood warning station. In at least one embodiment, warning the user of flooding can include triggering a visual warning at the flood monitoring station that reported the water level exceeding the threshold.

In at least one embodiment, the method for monitoring flooding can include receiving wirelessly, at the flood warning station, a confirmation message from the user. In at least one embodiment, the method for monitoring flooding can include communicating wirelessly, upon receiving the confirmation message, from the flood warning station to the flood monitoring station that reported the water level exceeding the threshold, a trigger message. In at least one embodiment, the method for monitoring flooding can include, upon receiving the trigger message, triggering a visual warning at the flood monitoring station that reported the water level exceeding the threshold.

In at least one embodiment, a method for monitoring flooding (which can include monitoring one or more environmental conditions, as discussed herein), can include two-way communications and/or bi-directional overrides. In at least one embodiment, such communications and/or overrides can include use of messaging protocols such as MQ Telemetry Transport (MQTT) for networked flood sensors.

In at least one embodiment, the method for monitoring flooding can include calculating a rate of rise of the water level at each flood monitoring station. In at least one embodiment, the method for monitoring flooding can include predicting, based on at least one of a rate of rise, a relative humidity sensor and/or a rainfall sensor, whether flooding is likely to occur at each flood monitoring station. In at least one embodiment, the method for monitoring flooding can include triggering a visual warning at a flood monitoring station where and/or when flooding is likely to occur and/or has occurred.

In at least one embodiment, a system for monitoring flooding can include a plurality of flood monitoring stations and at least one flood warning station in communication with each flood monitoring station. In at least one embodiment, each flood monitoring station can include at least one pressure transducer configured to detect water level. In at least one embodiment, each flood monitoring station can include at least one atmospheric pressure sensor. In at least one embodiment, each flood monitoring station can include at least one ambient temperature sensor. In at least one embodiment, each flood monitoring station can include a visual warning device.

In at least one embodiment, each flood monitoring station can include a processor and a wireless communications device. In at least one embodiment, the processor can be configured to determine a water level using the pressure transducer and/or one or more other sensors configured to detect water level. In at least one embodiment, the processor can be configured to determine a water level based on (e.g., in response to) a signal from at least one of an atmospheric pressure sensor and an ambient temperature sensor. In at least one embodiment, the processor can be configured to communicate the water level using the wireless communication device. In at least one embodiment, the processor can be configured to control the visual warning device. In at least one embodiment, the flood warning station can be in wireless communication with the processor at each flood monitoring station through the wireless communications device at each flood monitoring station.

In at least one embodiment, each flood monitoring station can include an ambient relative humidity sensor and/or a rainfall sensor. In at least one embodiment, the processor can be configured to determine the water level using the ambient relative humidity sensor and the rainfall sensor. In at least one embodiment, the processor can be configured to determine the water level only when one or more of the ambient relative humidity sensor and the rainfall sensor indicate adverse weather.

In at least one embodiment, the processor can be configured to determine the water level periodically, such as at a first period. In at least one embodiment, the processor can be configured to communicate the water level to the flood warning station using the wireless communication device periodically, such as at a second period. In at least one embodiment, the processor can be configured to communicate the water level to the flood warning station using the wireless communication device only when the water level exceeds a threshold. In at least one embodiment, the threshold can be different for two or more flood monitoring stations.

In at least one embodiment, the system for monitoring flooding can include a web page configured to display a status of each flood monitoring station. In at least one embodiment, the status of each flood monitoring station can indicate whether or not the water level at each flood monitoring station exceeds a threshold for each flood monitoring station.

In at least one embodiment, the flood warning station can be configured to alert a user when the water level at one or more of the flood monitoring stations exceeds a threshold. In at least one embodiment, the flood warning station can be configured to cause the processor at one or more of the flood monitoring stations to trigger the visual warning device upon receiving a confirmation from the user. In at least one embodiment, the processor of each flood monitoring station can be configured to trigger the visual warning device when the water level exceeds a threshold, with or without user intervention.

In at least one embodiment, the processor of each flood monitoring station can be configured to determine a rate of rise of the water level. In at least one embodiment, the processor of each flood monitoring station can be configured to predict based on the rate of rise, a relative humidity sensor, and a rainfall sensor whether flooding is likely to occur. In at least one embodiment, the processor of each flood monitoring station can be configured to trigger the visual warning device when the processor has determined that flooding is likely to occur.

BRIEF DESCRIPTION OF THE SEVERAL VIEWS OF THE DRAWINGS

FIG. 18 is a simplified diagram illustrating aspects of one of many embodiments of a control panel for a flood monitoring system according to the disclosure.

DETAILED DESCRIPTION OF THE INVENTION

Figure 1:
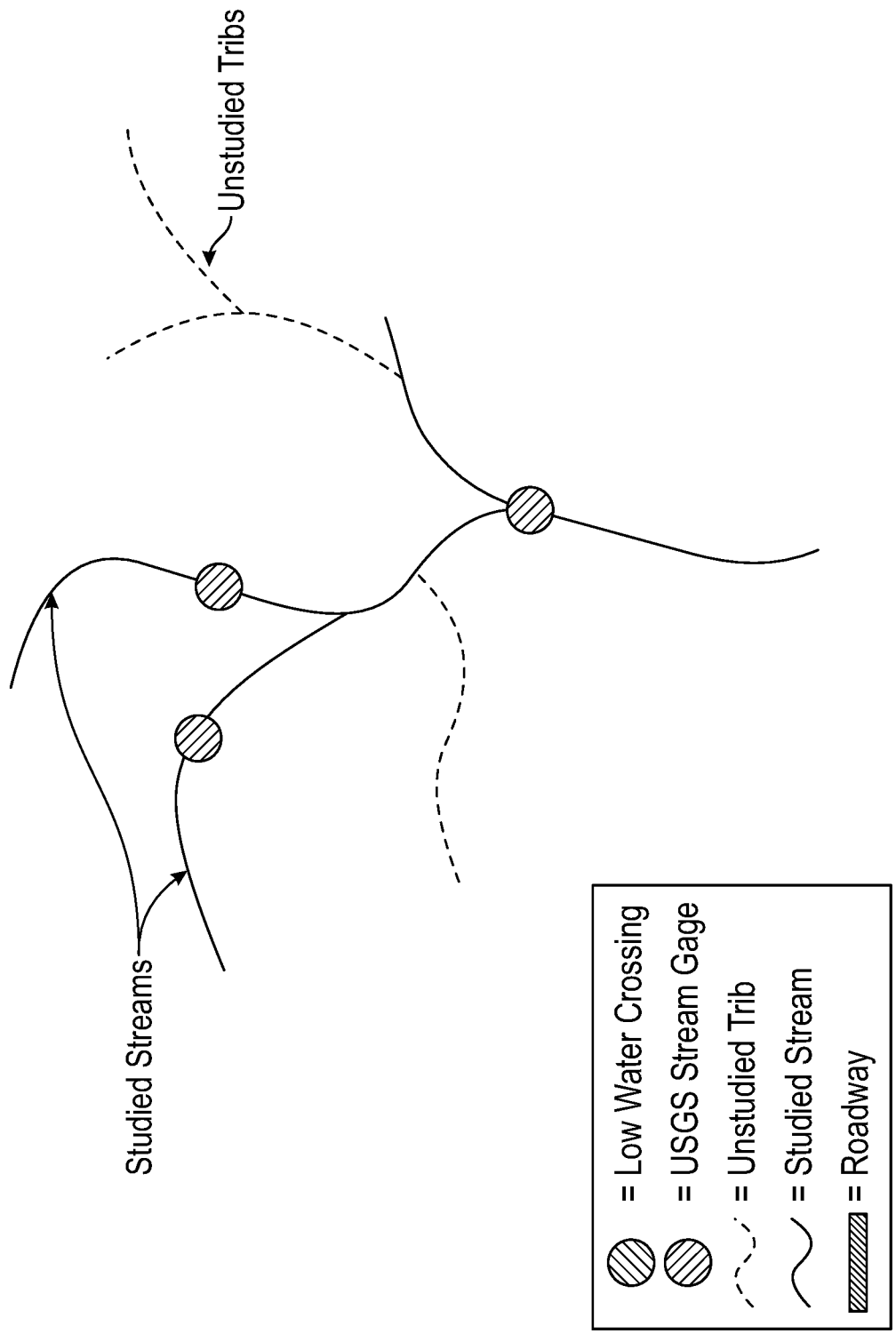
FIG. 1 is a simplified diagram of one of many embodiments of a stream gauge map according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Process flowcharts discussed herein illustrate the operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, blocks shown in succession may, in fact, be executed concurrently or at least substantially concurrently. It will also be noted that each block of a flowchart illustration can be implemented by special purpose hardware-based systems that perform the specified functions or acts, or combinations of special purpose hardware and computer instructions.

Applicants have created new and useful devices, systems and methods for monitoring impending or actual flooding conditions. In at least one embodiment, devices, systems and methods of the present disclosure advantageously can provide for a decentralized, industrial, Internet of Things (IoT) solution that is readily scalable and two-way operable for automatically detecting flooded roadways and which can be configured for long-term historical data retrieval. In at least one embodiment, devices, systems and methods of the present disclosure advantageously can provide for a comprehensive web-based product including functionality such as flood monitoring, monitoring flood warnings, mobile text message notification services, dispatching of road closure crews and informing community residents or travelers of potentially dangerous conditions via flasher beacons and/or other warning mechanisms. In at least one embodiment, a flood warning system according to the disclosure can include data collection and logging at the ground station level via an appropriately programmed microcontroller and a web-based software application in communication with one or more ground stations for taking one or more actions based on or in light of data collected.

In at least one embodiment, a method for monitoring flooding can include determining a water level at one or more flood monitoring stations, communicating water level information from each flood monitoring station to a flood warning station, and warning one or more users of actual or potential flooding in one or more locations when one or more water levels approaches or exceeds one or more thresholds. In at least one embodiment, a flood monitoring station can include at least one pressure transducer or other sensor configured to detect water level, whether separately or in combination with one or more other sensors. Water level can be sensed constantly, periodically or otherwise, and in at least one embodiment, water level sensing and/or the frequency thereof can depend at least partially on one or more variables or conditions, such as the presence of one or more environmental conditions conducive to flooding. Illustrative embodiments of the disclosure are described in more detail below with reference to the accompanying drawings.

Figure 2:
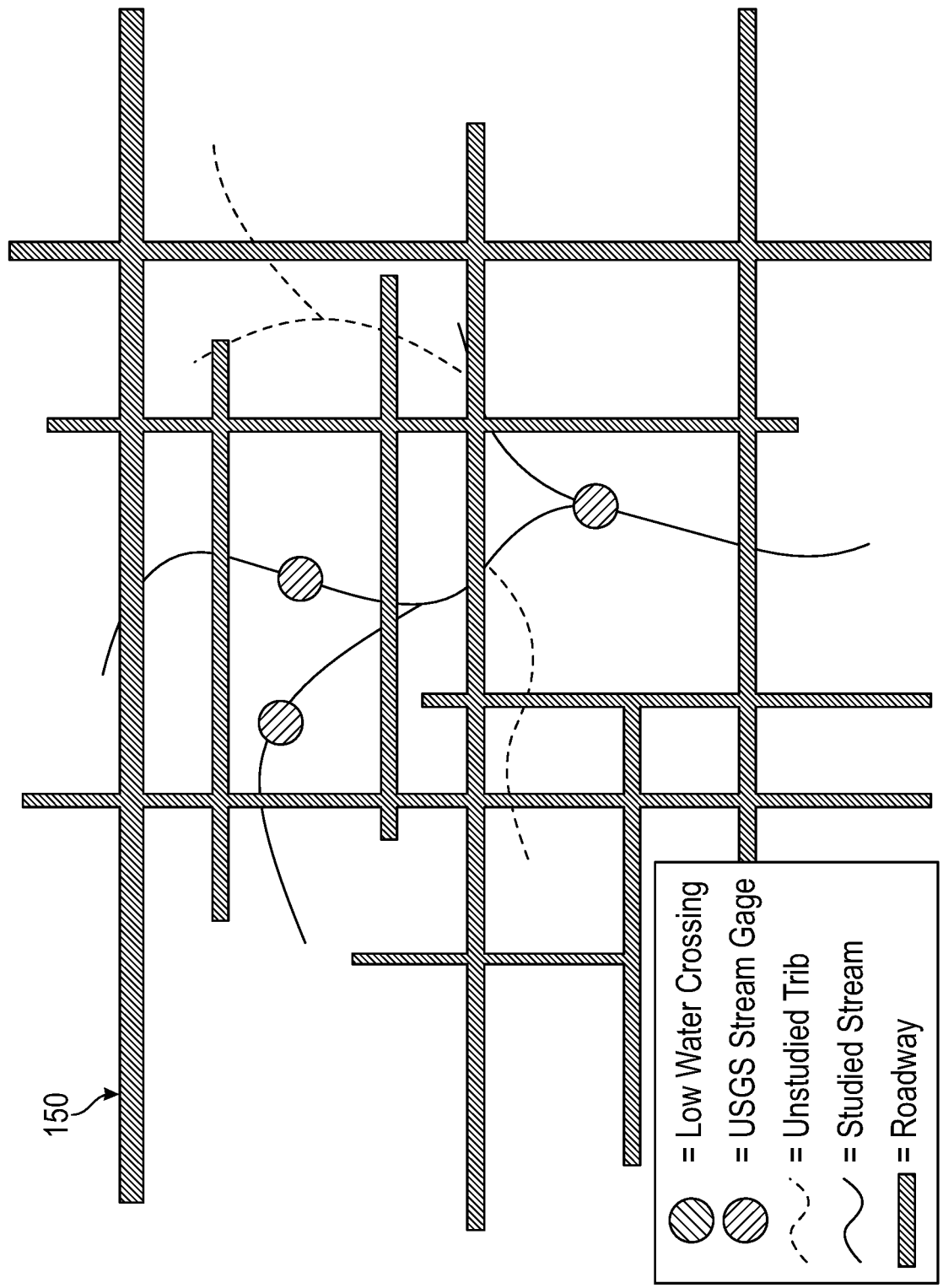
FIG. 2 is the diagram of FIG. 1 overlaid with a simplified road network.
Figure 3:
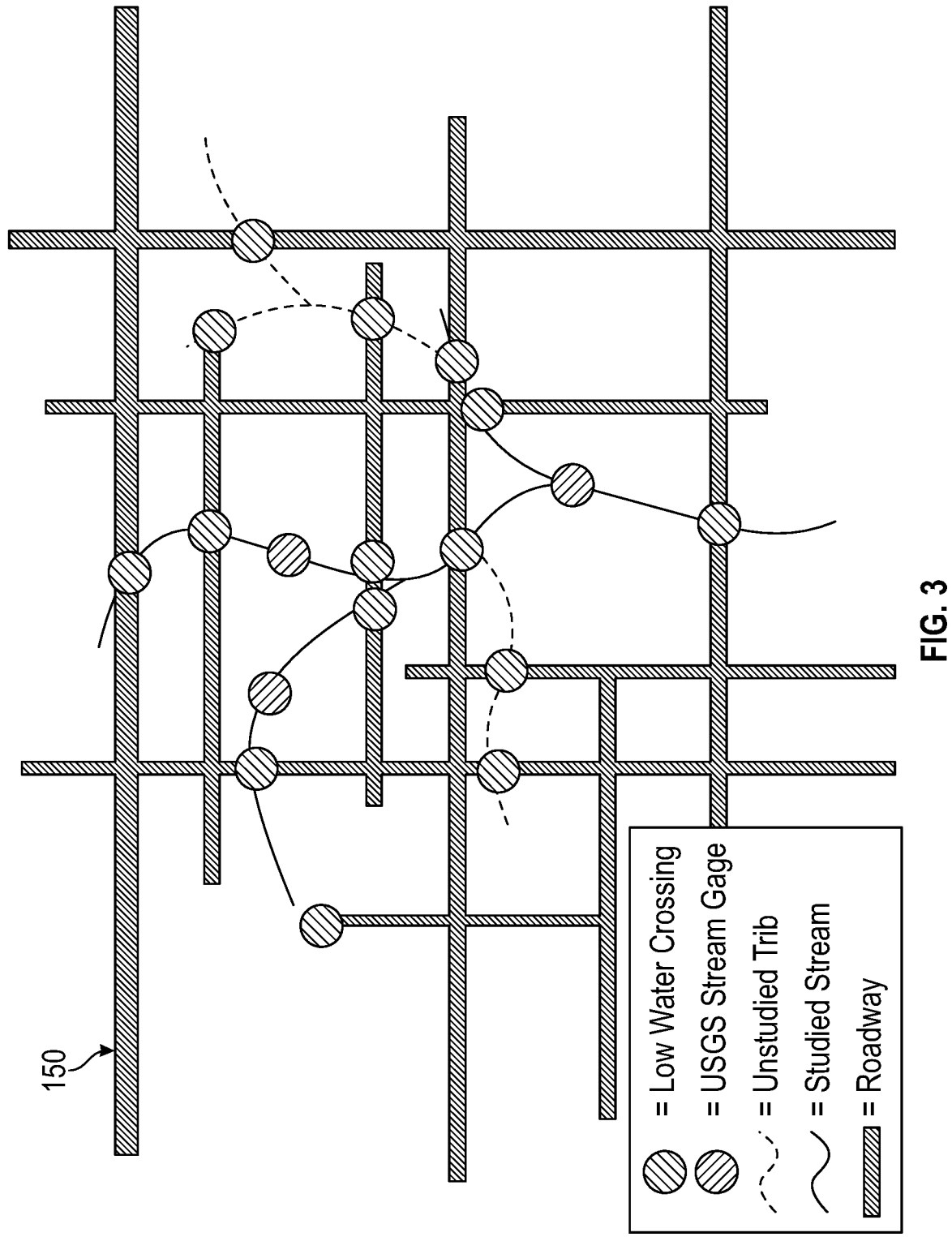
FIG. 3 is the diagram of FIG. 2 showing potential low water crossings, and thus potential roadway flooding points.
Figure 4:
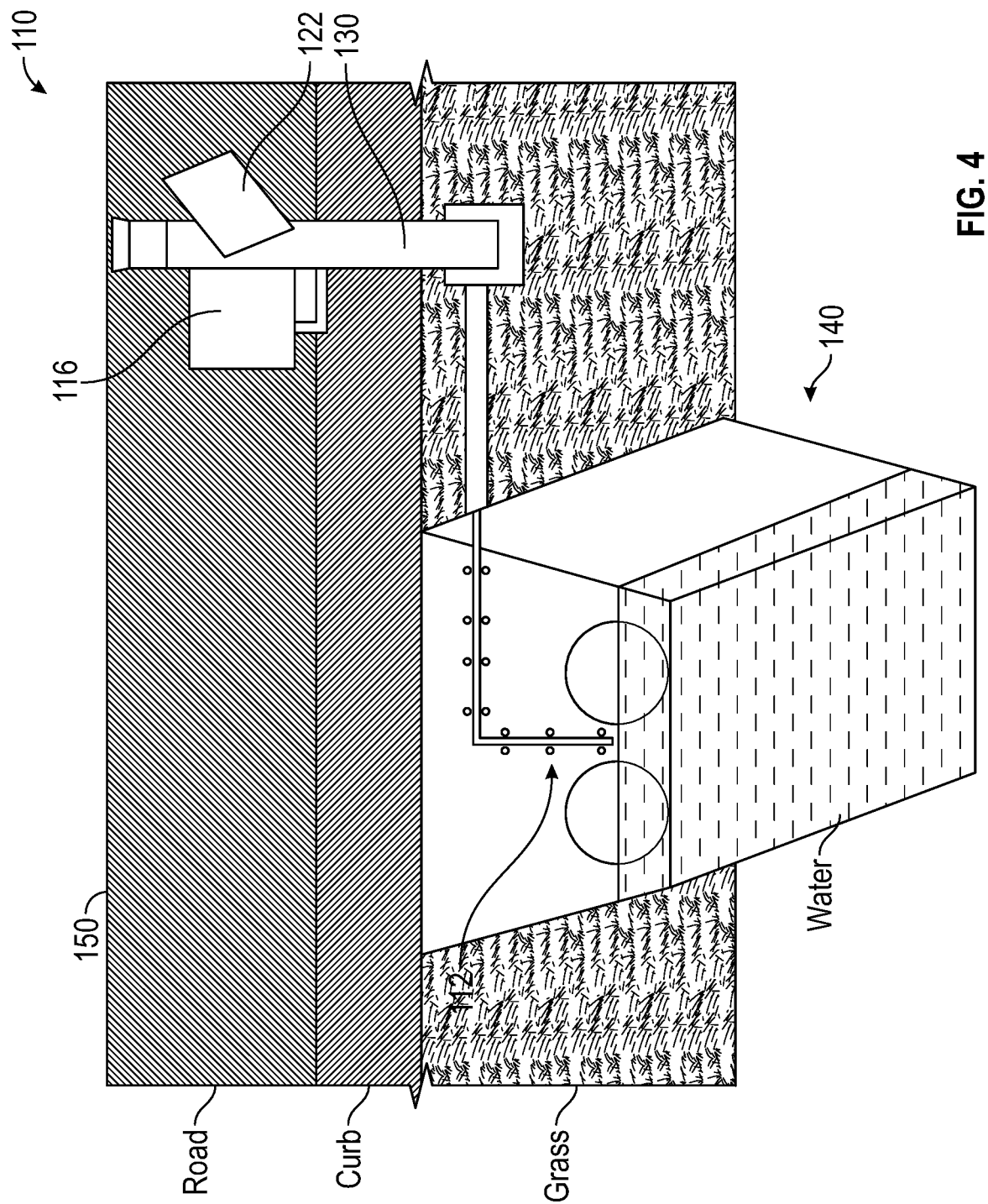
FIG. 4 is a simplified diagram of one of many embodiments of a flood monitoring station according to the disclosure.
Figure 5:
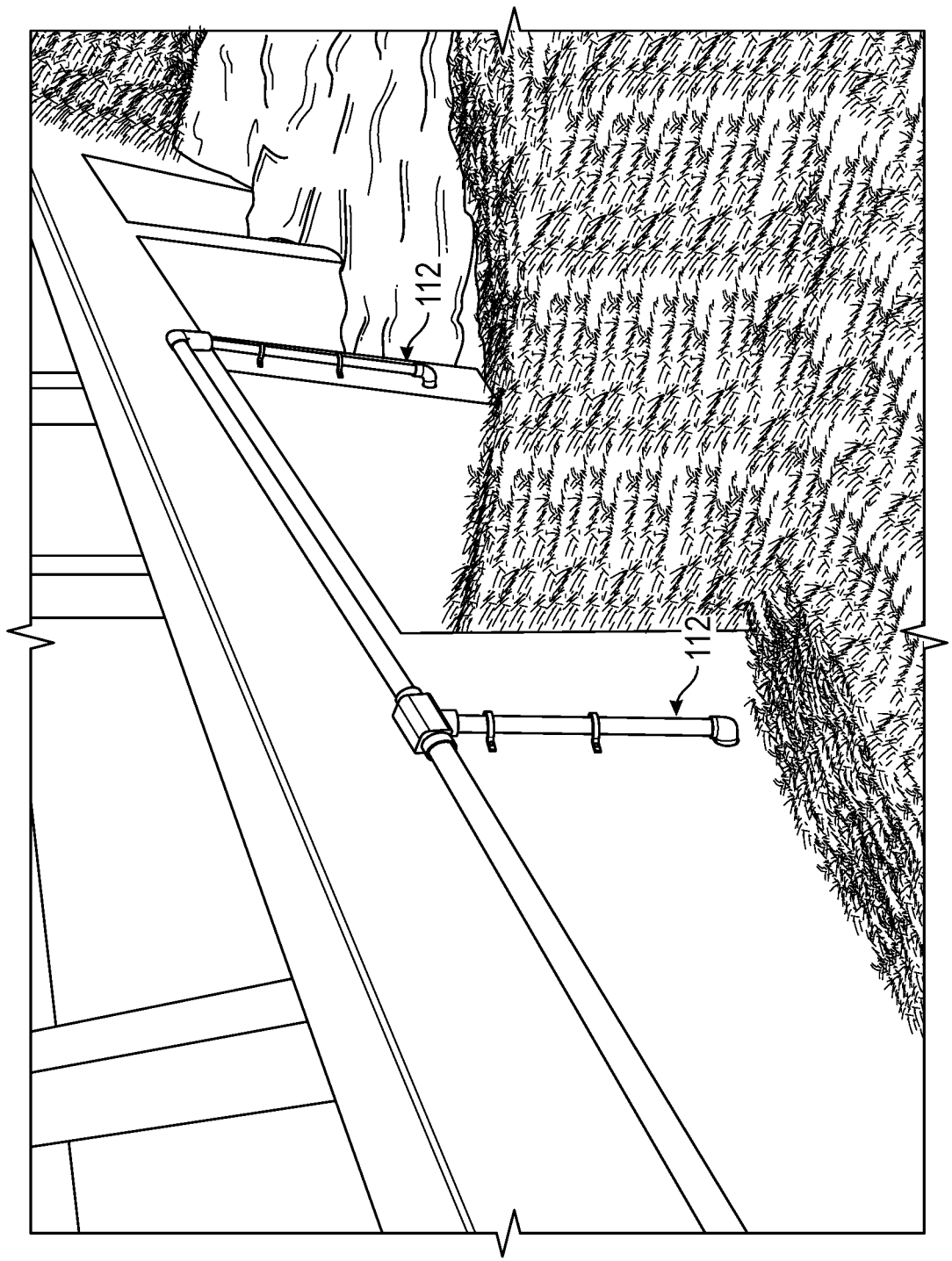
FIG. 5 is an image of one of many embodiments of a sensor assembly for use with a flood monitoring station according to the disclosure.
Figure 6:
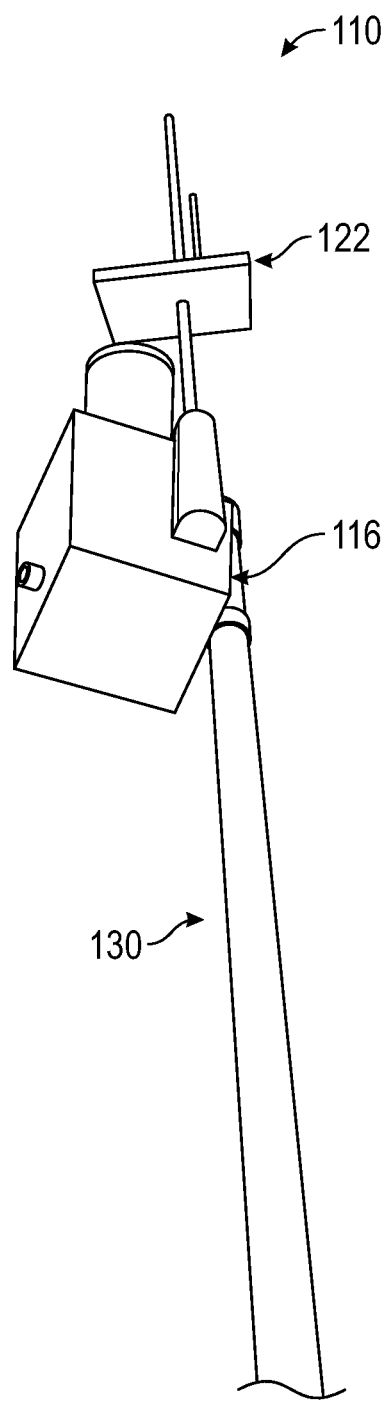
FIG. 6 is an image of one of many embodiments of a flood monitoring station according to the disclosure.
Figure 7:
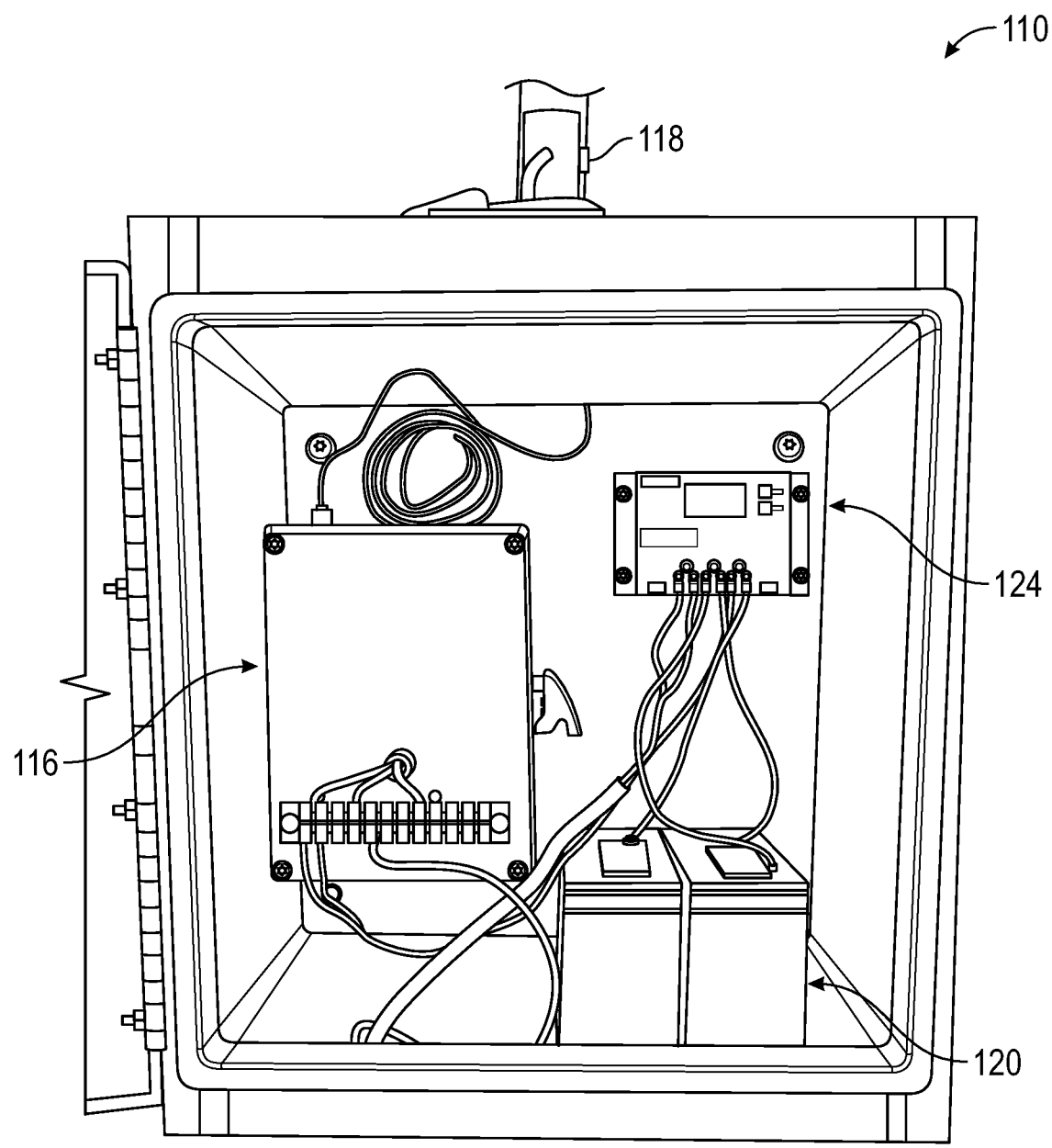
FIG. 7 is an image of one of many embodiments of a controller for use with a flood monitoring station according to the disclosure.
Figure 8:
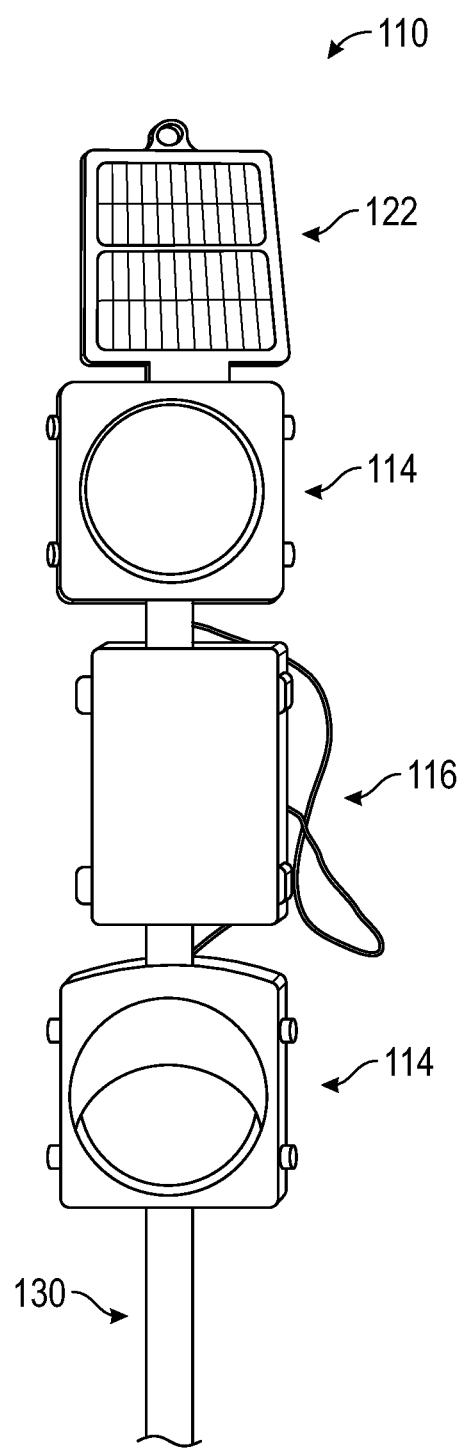
FIG. 8 is an image of another one of many embodiments of a flood monitoring station according to the disclosure.
Figure 9:
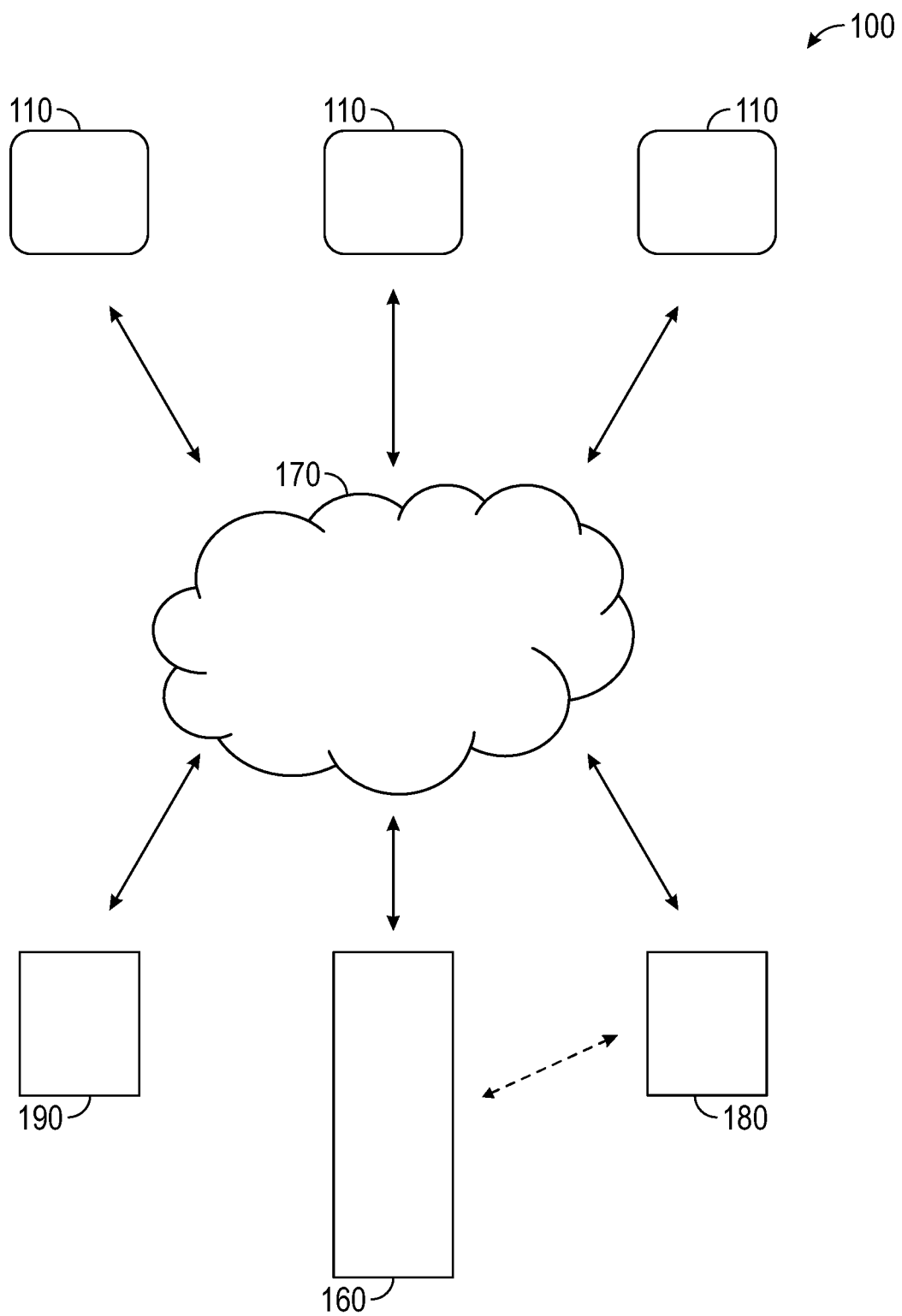
FIG. 9 is a simplified diagram of one of many embodiments of a flood monitoring system according to the disclosure.
Figure 10:
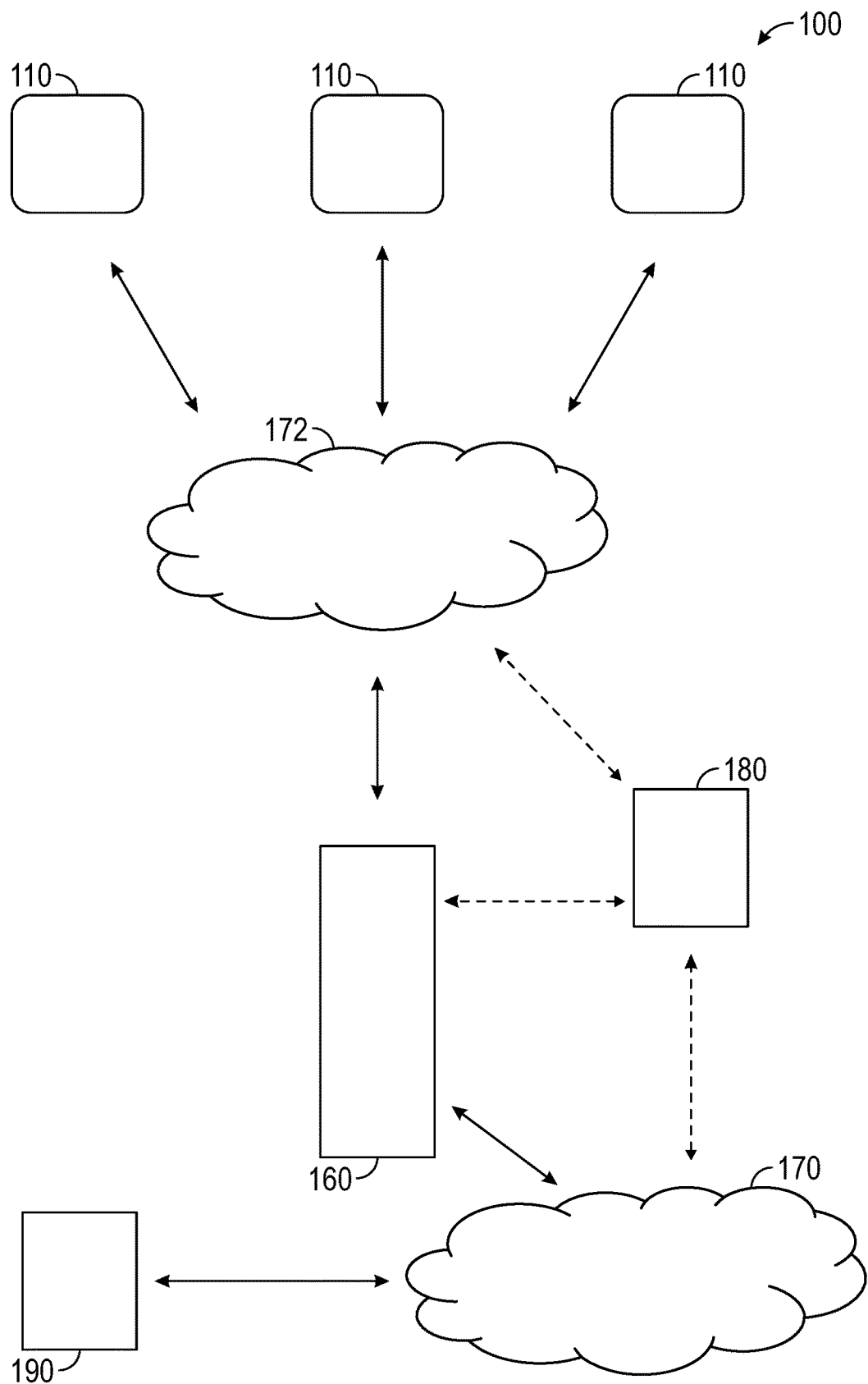
FIG. 10 is a simplified diagram of another one of many embodiments of a flood monitoring system according to the disclosure.
Figure 11:
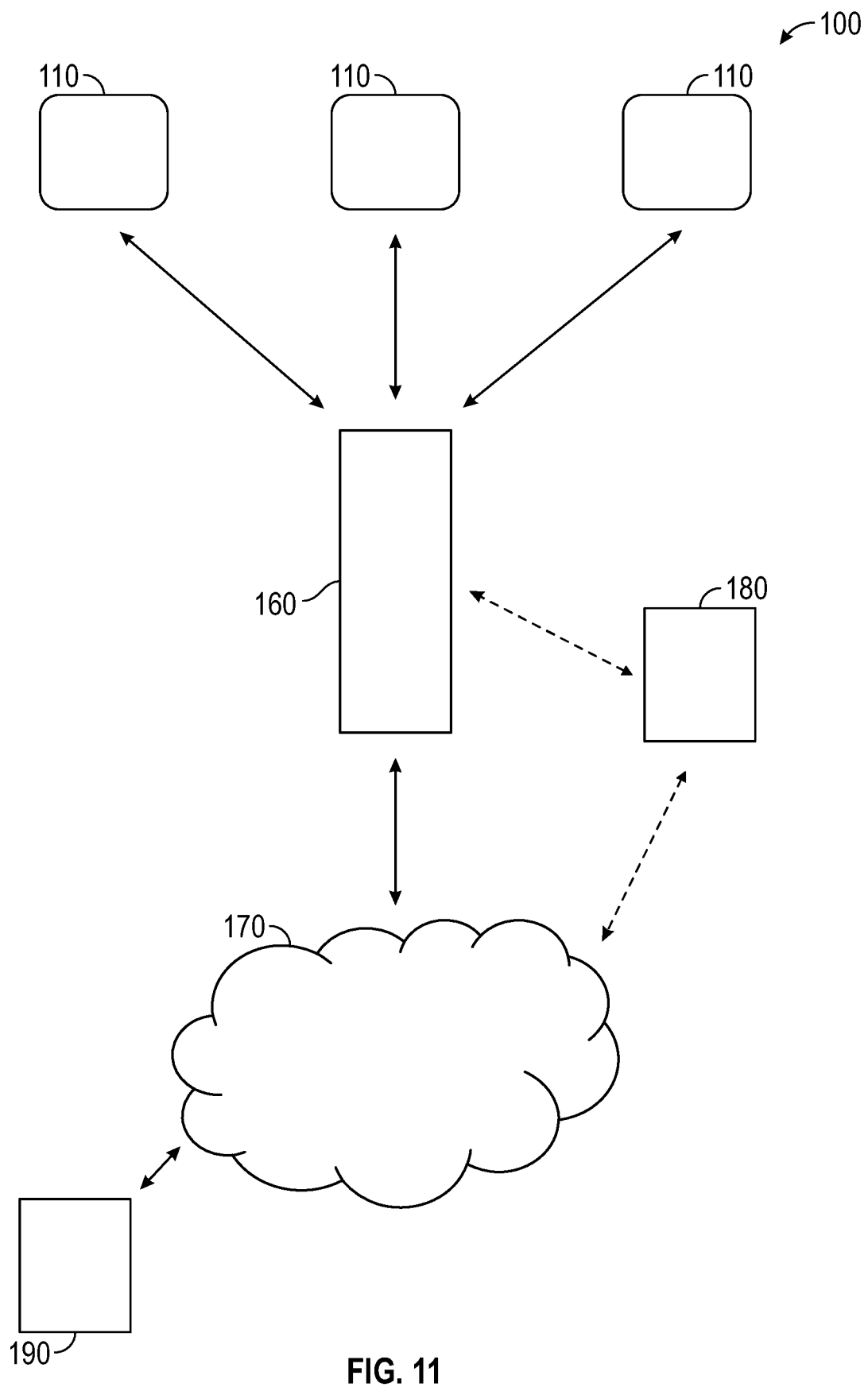
FIG. 11 is a simplified diagram of still another of many embodiments of a flood monitoring system according to the disclosure.
Figure 12:
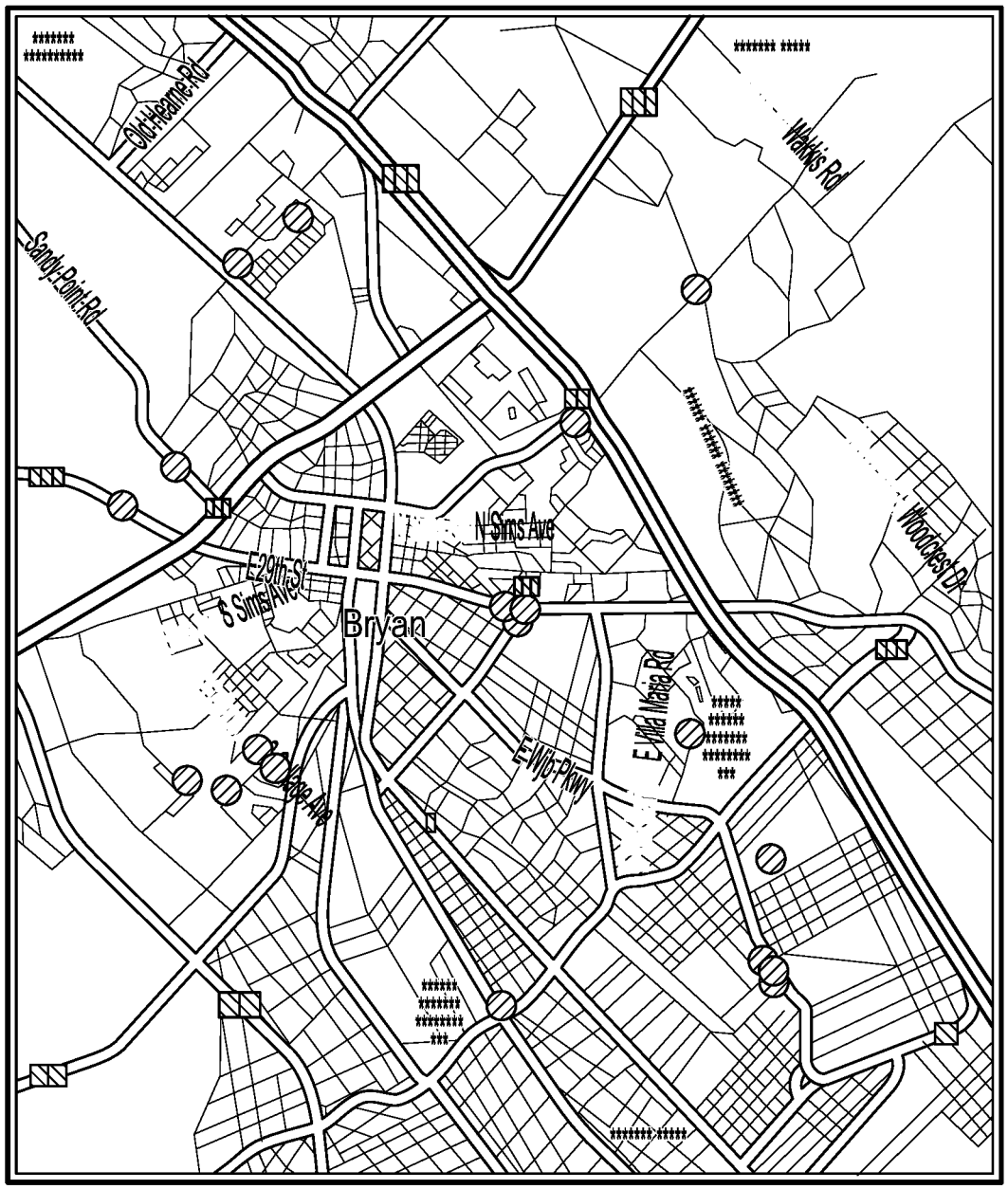
FIG. 12 is a simplified diagram of one of many embodiments of a flood monitoring map according to the disclosure.
Figure 13:
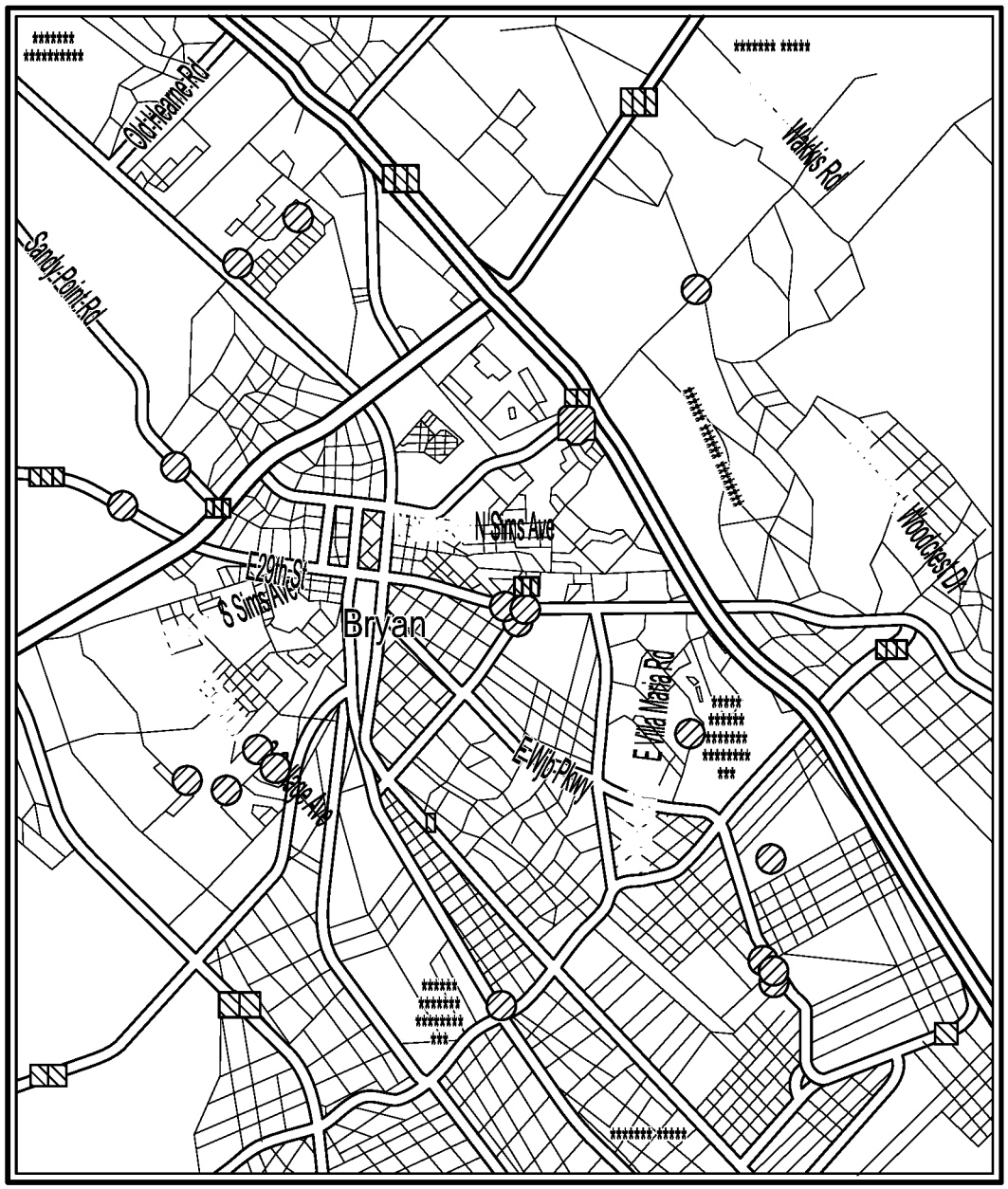
FIG. 13 is the diagram of FIG. 12 showing one flood monitoring station warning of flooding.
Figure 14:
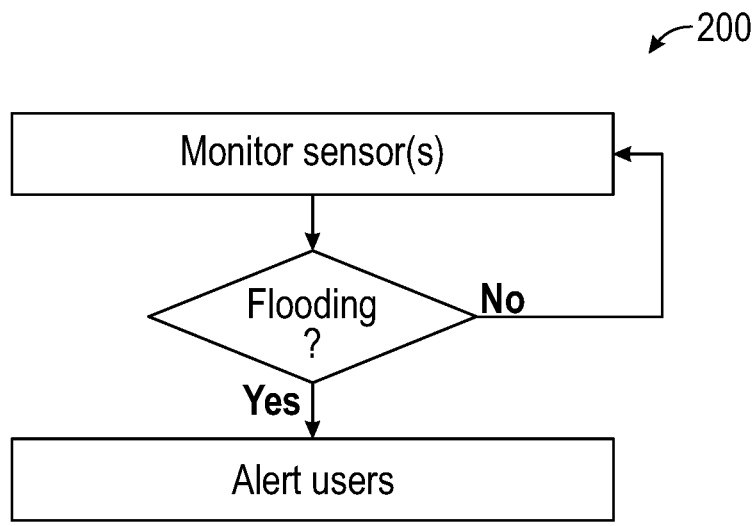
FIGS. 14-16 are flowcharts showing some of many embodiments of methods for providing warnings of impending or actual flooding conditions according to the disclosure.
Figure 15:
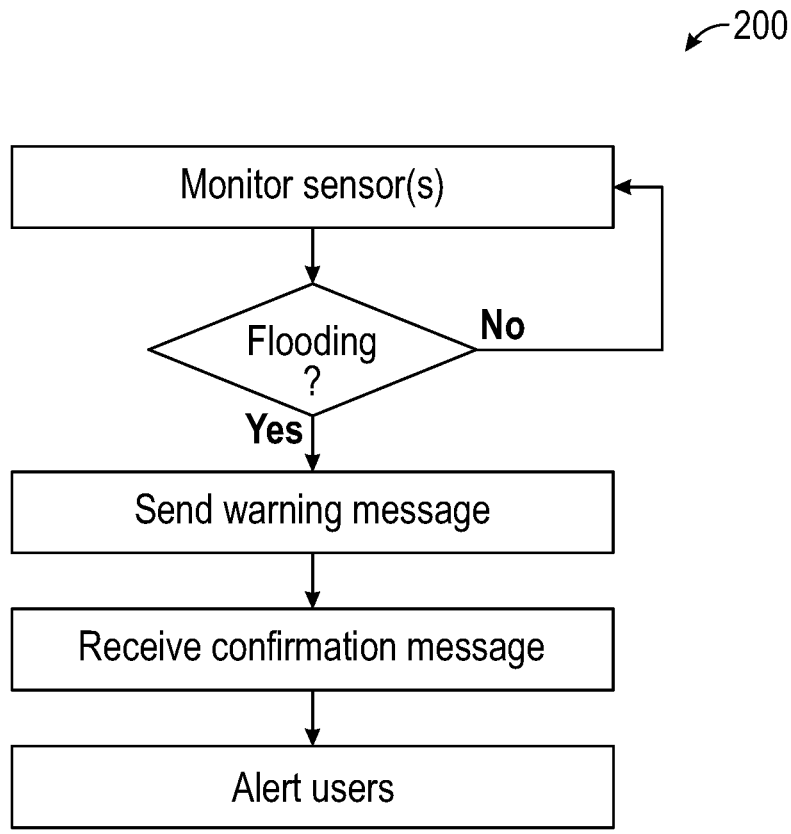
Figure 16:
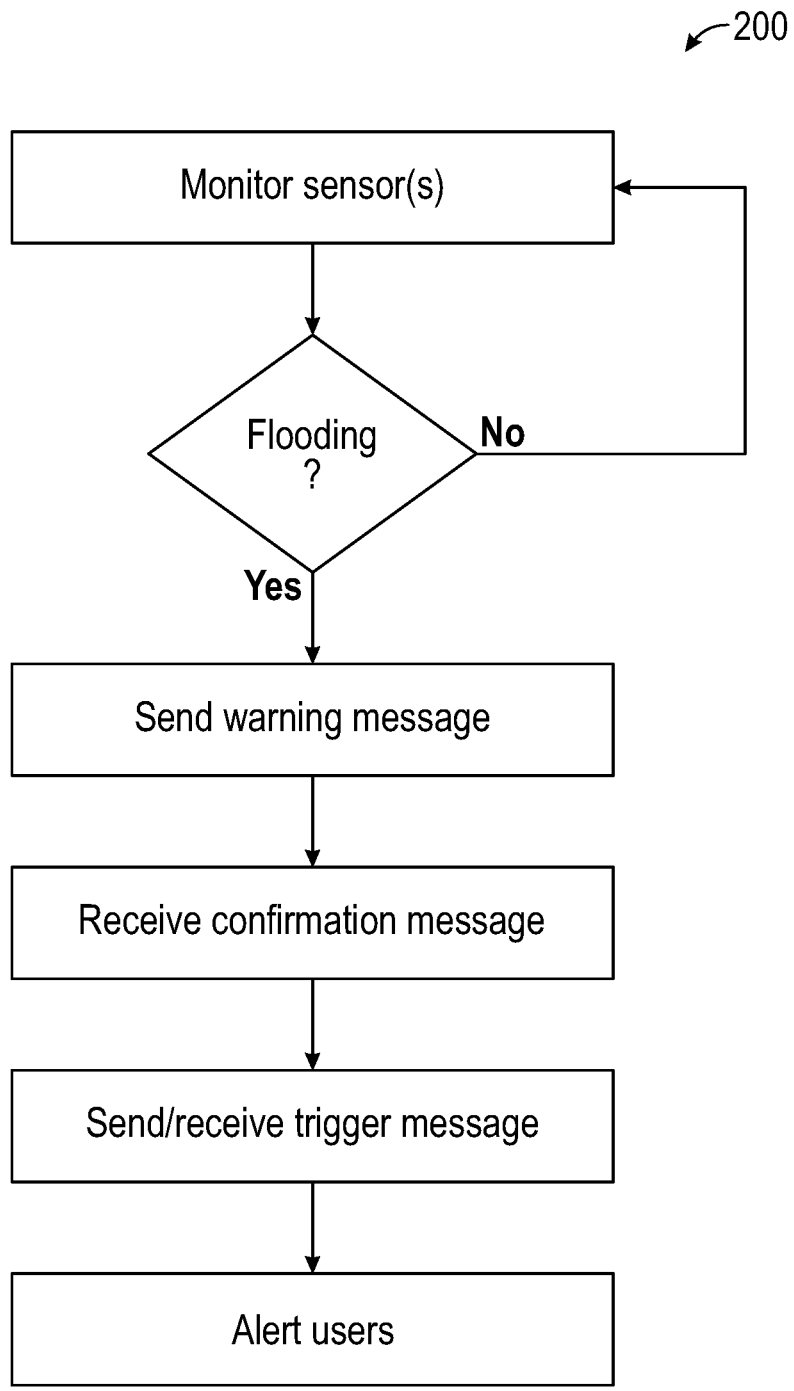
Figure 17:
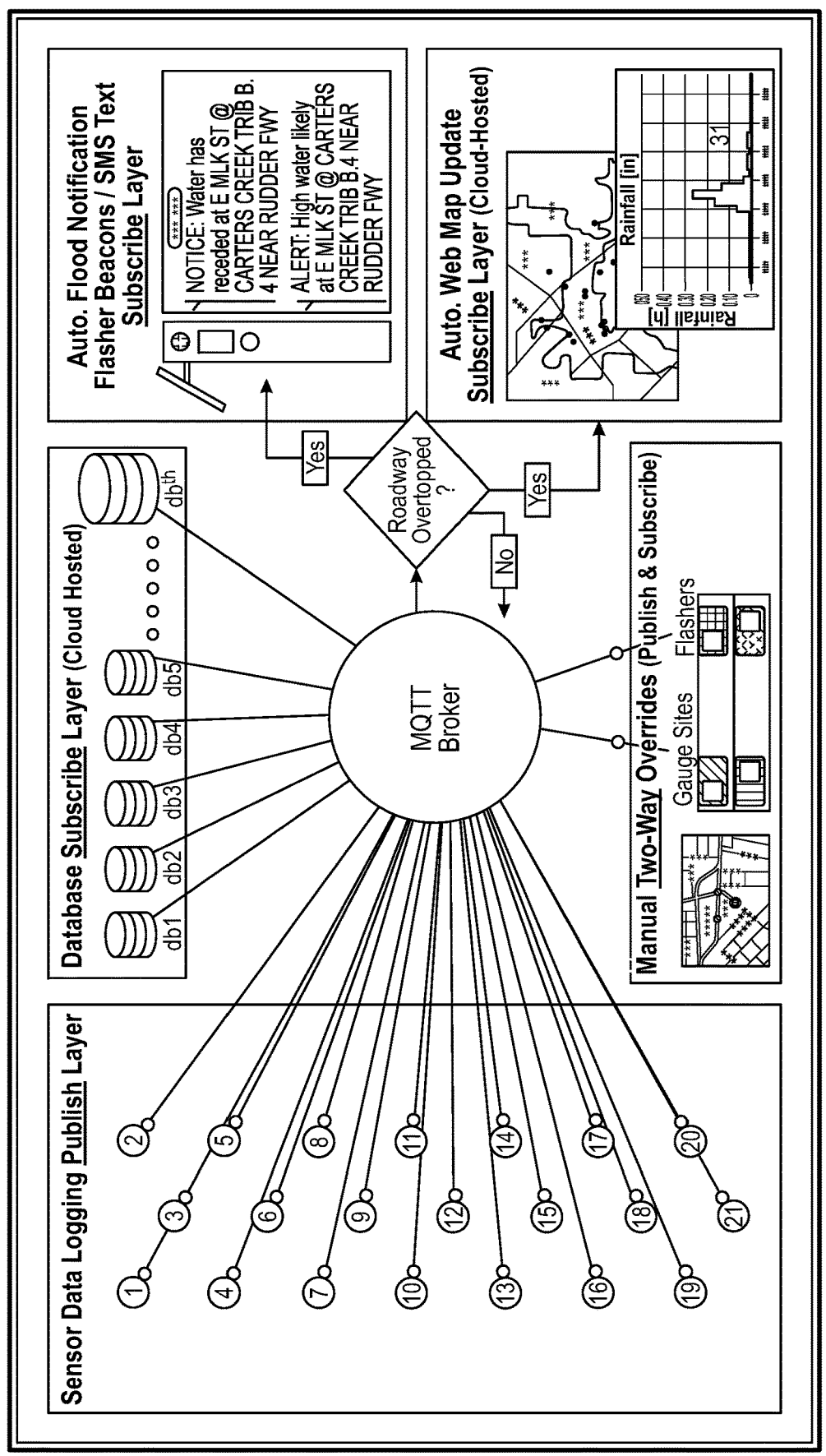
FIG. 17 is a simplified diagram illustrating aspects of one of many embodiments of a flood monitoring system according to the disclosure.
Figure 19:
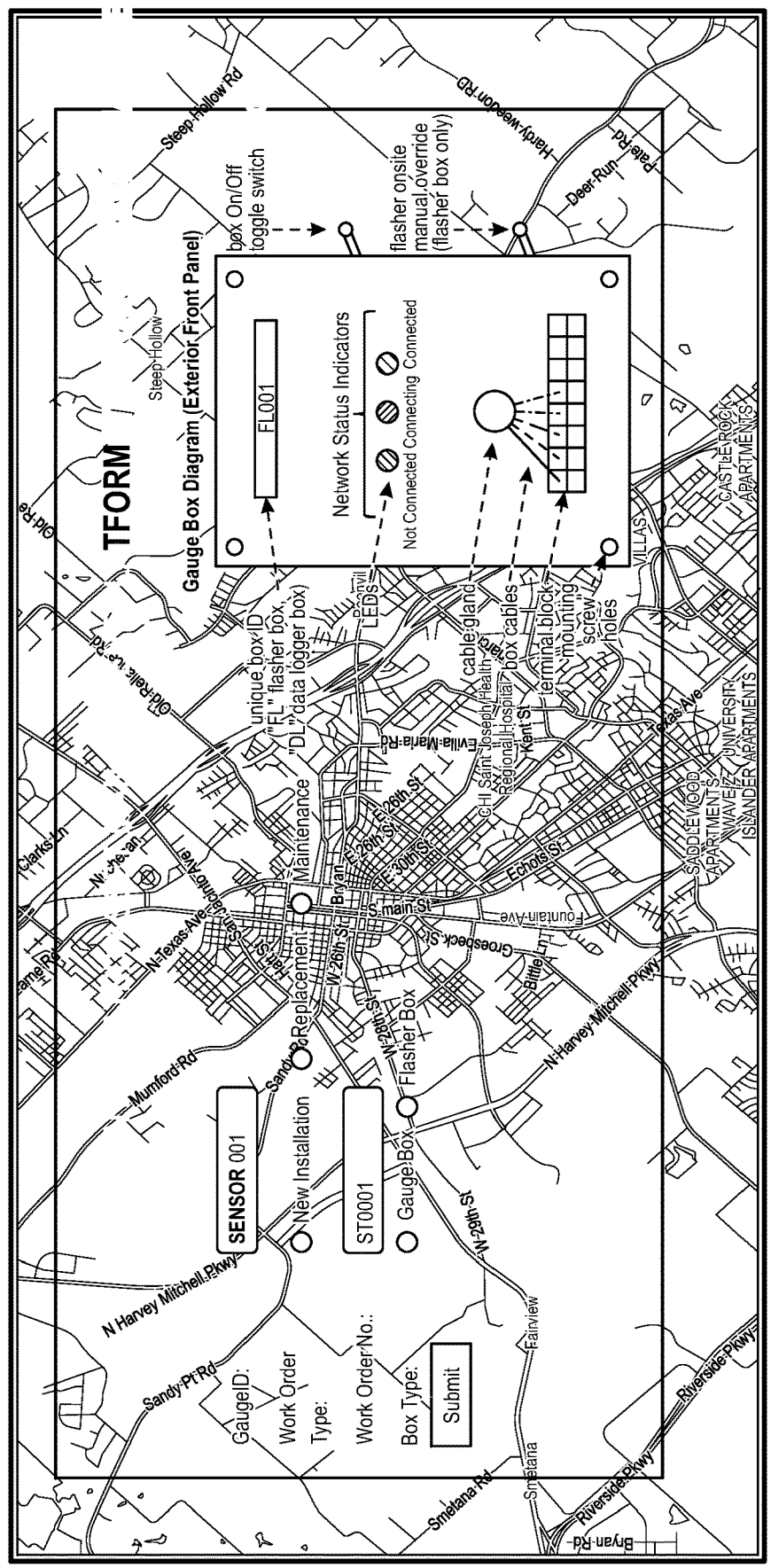
FIG. 19 is a simplified diagram illustrating aspects of one of many embodiments of an asset management platform for a flood monitoring system according to the disclosure.
Figure 20:
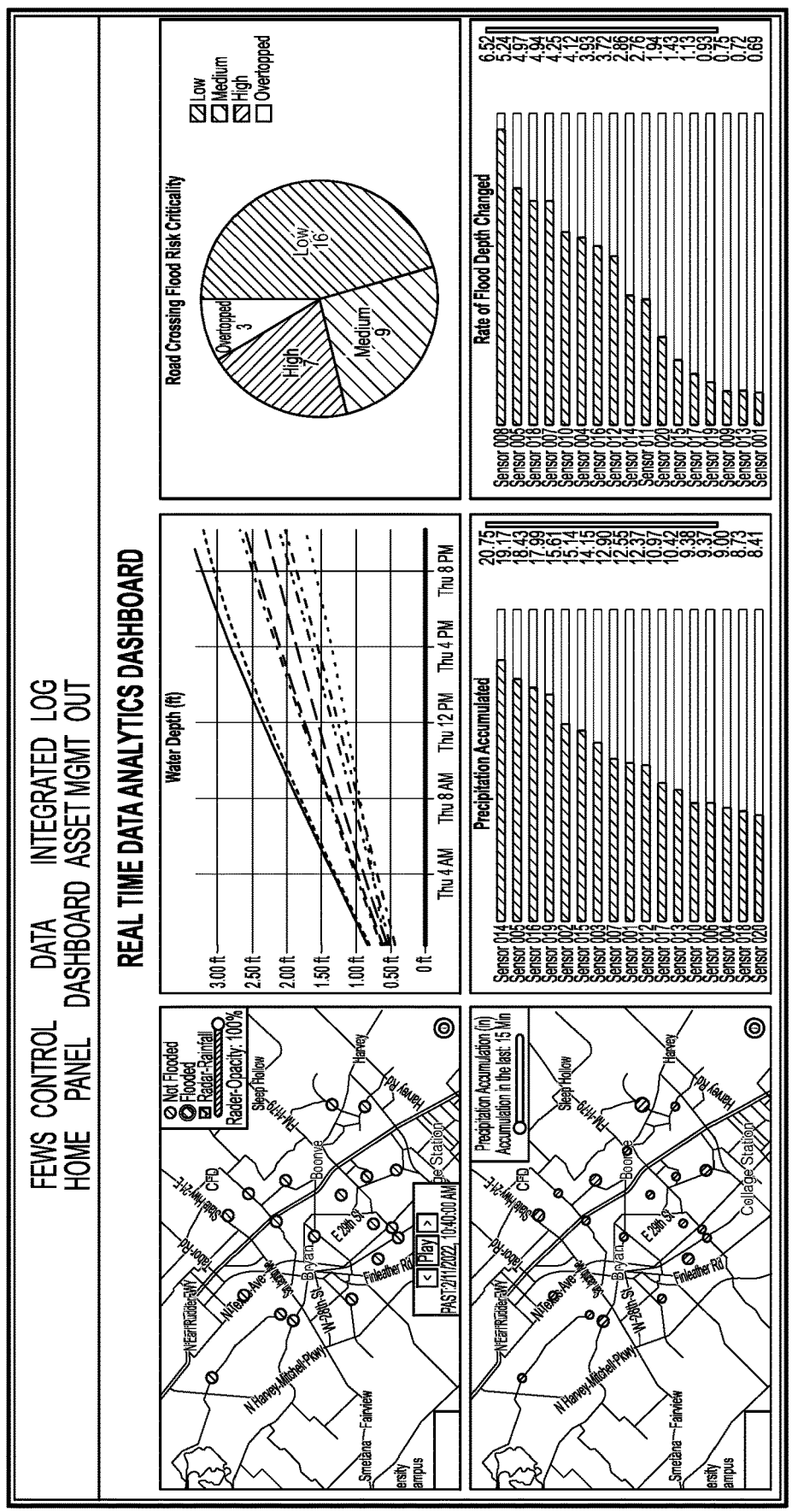
FIG. 20 is a simplified diagram illustrating aspects of one of many embodiments of a data analytics dashboard for a flood monitoring system according to the disclosure.

FIG. 1 is a simplified diagram of one of many embodiments of a stream gauge map according to the disclosure. FIG. 2 is the diagram of FIG. 1 overlaid with a simplified road network. FIG. 3 is the diagram of FIG. 2 showing potential low water crossings, and thus potential roadway flooding points. FIG. 4 is a simplified diagram of one of many embodiments of a flood monitoring station according to the disclosure. FIG. 5 is an image of one of many embodiments of a sensor assembly for use with a flood monitoring station according to the disclosure. FIG. 6 is an image of one of many embodiments of a flood monitoring station according to the disclosure. FIG. 7 is an image of one of many embodiments of a controller for use with a flood monitoring station according to the disclosure. FIG. 8 is an image of another one of many embodiments of a flood monitoring station according to the disclosure. FIG. 9 is a simplified diagram of one of many embodiments of a flood monitoring system according to the disclosure. FIG. 10 is a simplified diagram of another one of many embodiments of a flood monitoring system according to the disclosure. FIG. 11 is a simplified diagram of still another of many embodiments of a flood monitoring system according to the disclosure. FIG. 12 is a simplified diagram of one of many embodiments of a flood monitoring map according to the disclosure. FIG. 13 is the diagram of FIG. 12 showing one flood monitoring station warning of flooding. FIGS. 14-16 are flowcharts showing some of many embodiments of methods for providing warnings of impending or actual flooding conditions according to the disclosure. FIG. 17 is a simplified diagram illustrating aspects of one of many embodiments of a flood monitoring system according to the disclosure. FIG. 18 is a simplified diagram illustrating aspects of one of many embodiments of a control panel for a flood monitoring system according to the disclosure. FIG. 19 is a simplified diagram illustrating aspects of one of many embodiments of an asset management platform for a flood monitoring system according to the disclosure. FIG. 20 is a simplified diagram illustrating aspects of one of many embodiments of a data analytics dashboard for a flood monitoring system according to the disclosure. FIGS. 1-20 are described in conjunction with one another.

In at least one embodiment, a system 100 for monitoring flooding can include a plurality of flood monitoring stations 110 and at least one flood warning station 160 in communication with each flood monitoring station 110. In at least one embodiment, each flood monitoring station can include one or more sensors 112, such as one or more pressure transducers or other sensors configured to detect water level. Examples of such sensors can include, but are not limited to, ultrasonic sensors, contact-based sensors, radar sensors and air bubbler sensors. In at least one embodiment, the one or more sensors 112 can include one or more atmospheric pressure sensors and/or one or more ambient temperature sensors. As other example, in at least one embodiment, system 100 can include one or more traffic sensors configured to sense traffic conditions in one or more locations (e.g., along a roadway or across a bridge), one or more noise sensors for sensing noise or noise pollution in one or more areas, and/or one or more cameras for viewing and/or recording activity in one or more locations. In at least one embodiment, a camera (if present) can provide for a real time or other camera feed at a location of interest, such as via still images, video, or both.

In at least one embodiment, each flood monitoring station 110 can include a visual warning device 114. In at least one embodiment, a visual warning device 114 can include one or more lights, such as two alternatively flashing yellow lights 114.

In at least one embodiment, each flood monitoring station 110 can include a controller 116. In at least one embodiment, the controller 116 can include a processor and a wireless communications device 118, such as a cellular network communications module and/or an antenna. As other examples, in at least one embodiment, a wireless communications device 118 can be or include a communications device configured to communicate via Wi-Fi, Bluetooth, radio and/or satellite telemetry technologies, or another wireless communication technology (whether now known or future developed), whether separately or in combination with one another and/or with cellular communications capability. In at least one embodiment, the controller 116 can include one or more batteries 120 to power its components. In at least one embodiment, the controller 116 can include one or more solar panels 122 and a solar charge controller 124 to charge the batteries 118. In at least one embodiment, any or all of the components of the flood monitoring station 110, such as the controller 116 and/or the visual warning device 114, can be mounted on a pole 130, such as in a control box or housing for at least partially enclosing one or more components of system 100 and/or for protecting one or more system components from the elements.

In at least one embodiment, the pole 130 can be located adjacent a stream bed 140, or other waterway, and/or adjacent a roadway 150. In at least one embodiment, any of the sensors 112 can be mounted within the waterway 140 or on the pole 130. In at least one embodiment, a waterway 140 and/or roadway 150 can have multiple sensors 112 and/or poles 130 adjacent thereto. For example, a pole 130 can be located along a roadway 150 on opposite sides of a waterway 140. As another example, a pole 130 can be located along a second roadway 150, such as an intersecting roadway, to indicate flooding of a first roadway 150.

In at least one embodiment, the processor of the controller 116 can be configured to determine a water level using at least one of a pressure transducer, an atmospheric pressure sensor, an ambient temperature sensor, and a combination thereof. In at least one embodiment, the processor can be configured to communicate the water level using a wireless communication device 118. In at least one embodiment, the processor can be configured to control the visual warning device 114.

In at least one embodiment, a flood warning station 160 can be in wireless communication with one or more processors at each flood monitoring station 110 through the wireless communications device 118 at each flood monitoring station 110. In at least one embodiment, the flood warning station 160 can be in direct wireless communication with the processor at each flood monitoring station 110 through the wireless communications device 118 at each flood monitoring station 110. In at least one embodiment, the flood warning station 160 can be in wireless communication with the processor at each flood monitoring station 110 through the wireless communications device 118 at each flood monitoring station 110 and/or a network 170, such as the Internet. For example, in at least one embodiment, system 100 can include a web based portal for facilitating one-way or two-way communication between or among two or more other system components, such as one or more flood monitoring stations 110, one or more flood warning stations 160 and/or other system components.

In at least one embodiment, the sensors 112 can include an ambient relative humidity sensor and/or a rainfall sensor. In at least one embodiment, the processor of the controller 116 can be configured to determine the water level using the ambient relative humidity sensor and the rainfall sensor. In at least one embodiment, the processor can be configured to determine the water level only when one or more of the ambient relative humidity sensor and the rainfall sensor indicate adverse weather. In such an embodiment, which is but one of many, system 100 advantageously can be configured for throttling back or reducing sampling rates, sensing frequency and/or other variables, e.g., during environmental conditions wherein the likelihood of flooding is low, which can reduce the amount of data transfer that takes place at one or more times and thereby can reduce operation costs.

In at least one embodiment, the processor can be configured to determine the water level periodically, such as at a first period. In at least one embodiment, the processor can be configured to communicate the water level or water level reading to the flood warning station 160 using the wireless communication device 118 periodically, such as at a second period. In at least one embodiment, the processor can be configured to communicate the water level to the flood warning station 160 using the wireless communication device 118 only when the water level exceeds a threshold, which can be or include any threshold(s) required or desired according to an implementation of the disclosure. In at least one embodiment, the threshold can be different for each flood monitoring station. In at least one embodiment, the threshold can be the same for each flood monitoring station. In at least one embodiment, the threshold can be the same for some flood monitoring stations and different for other flood monitoring stations.

In at least one embodiment, system 100 for monitoring flooding can include a web page configured to display a status of each flood monitoring station 110, such as shown in FIG. 12 and FIG. 13. In at least one embodiment, the status of each flood monitoring station can indicate whether or not the water level at each flood monitoring station 110 exceeds a threshold for each flood monitoring station 110. In at least one embodiment, the webpage can include a map that shows the location of each flood monitoring station 110 and associates a first color (such as green) and/or symbol with each flood monitoring station 110 that is not experiencing actual or predicted flooding. In at least one embodiment, the webpage can include a map that shows the location of each flood monitoring station 110 and associates a second color (such as red) and/or symbol with each flood monitoring station 110 that is experiencing actual or predicted flooding. In at least one embodiment, the webpage can include a map that shows the location of each flood monitoring station 110 and associates a third color (such as yellow) and/or symbol with each flood monitoring station 110 that is experiencing predicted, but not actual, flooding.

In at least one embodiment, the flood warning station 160 can be configured to alert a user 180, 190 when the water level at one or more of the flood monitoring stations 110 exceeds a threshold. In at least one embodiment, the flood warning station 160 can be configured to cause the processor at one or more of the flood monitoring stations 110 to trigger the visual warning device 114 upon receiving a confirmation from a controlling user 180, such as an operator or supervisor. In at least one embodiment, the processor of each flood monitoring station 110 can be configured to trigger the visual warning device 114 when the water level exceeds a threshold, with or without user intervention. In at least one embodiment, system 100 can be configured for allowing a user 180, 190 to override one or more devices or statuses at a flood monitoring station 110, such as, for example, to enable or disable the visual warning device 114 regardless of the water level reading. In at least one embodiment, system 100 can be configured for confirming receipt or nonreceipt of one or more signals or other communications transmitted or sent to one or more components of the system, such as a flood monitoring station 110 or visual warning device 114. For example, system 100 can include one or more graphical user interfaces (GUIs) for visually and/or audibly alerting a user regarding the receipt or nonreceipt of one or more signals by one or more system components.

In at least one embodiment, system 100 can be utilized by two or more classes of users 180, 190. For example, a controlling user 180, such as an operator or supervisor, can have direct control over, or communication with, any or all of the flood monitoring stations 110 and/or the flood warning station 160. In at least one embodiment, the controlling user 180 can trigger the visual warning device 114 at any or all of the flood monitoring stations 110 directly, or through the flood warning station 160. Further, in at least one embodiment, system 100 can include one or more manual overrides at any or all visual warning devices 114 and/or at any or all of the flood monitoring stations 110 for enabling one or more technicians or other users in the field to override the warning status at one or more locations within system 100, if need be, such as, for example, in the event of damage to or malfunction of one or more system components.

FIG. 17 and FIG. 18 show exemplary control panel interfaces for use by the controlling user 180. In at least one embodiment, the controlling user can utilize the control panel for receiving real-time indications and providing remote override capability to online mapping conditions and the visual indicators 114. FIG. 19 shows an exemplary asset management interface that can be used to manage installation, replacement, and/or maintenance tasks associated with the flood monitoring stations 110. In at least one embodiment, this management interface can be used to organize work orders (install, repair, replacement) and manage sensor/indicator inventory. FIG. 20 shows an exemplary analytics interface for tracking and analyzing the data produced by the flood monitoring stations 110. In at least one embodiment, this analytics interface can be used to re-purpose, or represent, the sensor information into digestible formats for decision-making. Any, or all, of these interfaces can be made available to the controlling user 180 through the flood warning station 160.

In at least one embodiment, when a flood monitoring station 110 detects actual flooding, or predicts flooding, the flood monitoring station 110 and/or the flood warning station 160 can send any or all of the users 180, 190 a warning message, warning the user 180, 190 of actual or predicted flooding. In at least one embodiment, the controlling user 180 can send a confirmation message to the flood monitoring station 110 and/or the flood warning station 160, which can be used to confirm or acknowledge actual or predicted flooding. In at least one embodiment, the flood warning station 160 can send a trigger message to the flood monitoring station 110, upon receipt of the confirmation message, thereby authorizing, or triggering, the flood monitoring station 110 to trigger its visual warning device 114, thereby alerting other users 190, such as drivers in the vicinity of the actual or predicted flooding. In at least one embodiment, the controller 116, upon receipt of the confirmation message, can trigger its visual warning device 114, thereby alerting other users 190, such as drivers in the vicinity, of the actual or predicted flooding without waiting for the trigger message from the flood warning station 160. In at least one embodiment, the controller 116 can trigger its visual warning device 114, thereby alerting other users 190, such as drivers in the vicinity, of the actual or predicted flooding without waiting for the trigger message from the flood warning station 160 or the confirmation message from the user 180.

In at least one embodiment, the system 100 can utilize or include one or more networks 170, 172. For example, the flood monitoring stations 110 can communicate with the flood warning station 160 directly, or over the network 170. In at least one embodiment, the flood monitoring stations 110 can communicate with the flood warning station 160 over a private network 172, which can be completely separate from the network 170, or be a portion thereof, such as a Virtual Private Network (VPN). In at least one embodiment, the controlling user 180 can communicate with the flood monitoring stations 110 and/or the flood warning station 160 directly, or over the network 170. In at least one embodiment, the controlling user 180 can communication with the flood monitoring stations 110 and/or the flood warning station 160 over the network 170 and/or the private network 172. In at least one embodiment, the system 100 can limit the access of regular non-controlling users 190 to read/display only, such that they can be alerted of actual or predicted flooding but cannot participate in communication between the flood monitoring stations 110, the flood warning station 160, and/or the controlling user 180. Communication between the flood monitoring stations 110, the flood warning station 160, and/or the controlling user 180 can be facilitated using an Internet of Things (IoT) protocol, such as Message Queuing Telemetry Transport (MQTT).

In at least one embodiment, the processor of each flood monitoring station 110 can be configured to determine a rate of rise of the water level. In at least one embodiment, the processor of each flood monitoring station 110 can be configured to predict based on the rate of rise, a relative humidity sensor, and/or a rainfall sensor whether flooding is likely to occur. In at least one embodiment, the processor of each flood monitoring station 110 can be configured to trigger the visual warning device 114 when the processor has determined that flooding is likely to occur.

In at least one embodiment, a method 200 for monitoring flooding can include providing, or monitoring, a plurality of flood monitoring stations 110, determining, at each flood monitoring station 110, a water level, communicating wirelessly, from each flood monitoring station 110 to a flood warning station 16, a most recent water level determined by each flood monitoring station 110, and warning a user 180, 190 of flooding when one or more of the most recent water levels determined by each flood monitoring station 110 exceeds a threshold.

In at least one embodiment, each flood monitoring station 110 can include at least one pressure transducer or other sensor 112 configured to detect water level. In at least one embodiment, each flood monitoring station 110 can include at least one atmospheric pressure sensor. In at least one embodiment, each flood monitoring station 110 can include at least one ambient temperature sensor. In at least one embodiment, determining the water level can be done using at least one pressure transducer, at least one atmospheric pressure sensor, and/or at least one ambient temperature sensor.

In at least one embodiment, each flood monitoring station 110 can include a relative humidity sensor and/or a rainfall sensor. In at least one embodiment, the water level can be determined at each flood monitoring station 110 additionally using a relative humidity sensor and a rainfall sensor located at each flood monitoring station. In at least one embodiment, the water level can be determined at each flood monitoring station 110 only when one or more of a relative humidity sensor and a rainfall sensor indicate adverse weather.

In at least one embodiment, system 100 can be configured for determining or sensing water level temporally, such as at one or more times, time series and/or rates. For example, in at least one embodiment, determining a water level can be done at a first periodic rate. In at least one embodiment, communicating the most recent water level can be done wirelessly (i.e., via wireless communication) at a second periodic rate. In at least one embodiment, the first periodic rate is the same as the second periodic rate. In at least one embodiment, the first periodic rate can be less than the second periodic rate. In at least one embodiment, the first periodic rate can be greater than the second periodic rate.

In at least one embodiment, warning the user 180, 190 of flooding can include communicating wirelessly a warning message to the user 180, 190 (e.g., via an application or "app" running on a smart phone or other electronic device) from the flood warning station, directly or indirectly. In at least one embodiment, warning the user 180, 190 of flooding can include triggering a visual warning 114 at the flood monitoring station 110 that reported the water level exceeding the threshold.

In at least one embodiment, a method 200 for monitoring flooding can include receiving wirelessly, at the flood warning station 110, a confirmation message from the user 180. In at least one embodiment, a method 200 for monitoring flooding can include communicating wirelessly, upon receiving the confirmation message, from the flood warning station 160 to the flood monitoring station 110 that reported the water level exceeding the threshold, a trigger message.

In at least one embodiment, the method 200 for monitoring flooding can include, upon receiving the trigger message, triggering a visual warning at the flood monitoring station that reported the water level exceeding the threshold.

In at least one embodiment, the method 200 for monitoring flooding can include calculating a rate of rise of the water level at each flood monitoring station 110. In at least one embodiment, the method 200 for monitoring flooding can include predicting based on a rate of rise, a relative humidity sensor, and/or a rainfall sensor whether flooding is likely to occur at each flood monitoring station 110. In at least one embodiment, the method 200 for monitoring flooding can include triggering a visual warning 114 at a flood monitoring station 110 where and/or when flooding is likely to occur.

In at least one embodiment, a method for monitoring flooding can include providing a plurality of flood monitoring stations, determining, at each flood monitoring station, a water level, communicating wirelessly, from each flood monitoring station to a flood warning station, a most recent water level determined by each flood monitoring station, and warning a user of flooding when one or more of the most recent water levels determined by each flood monitoring station exceeds a threshold. In at least one embodiment, each flood monitoring station can include at least one pressure transducer or other sensor configured to detect water level. In at least one embodiment, each flood monitoring station can include at least one atmospheric pressure sensor. In at least one embodiment, each flood monitoring station can include at least one ambient temperature sensor. In at least one embodiment, determining the water level can be done using at least one pressure transducer, at least one atmospheric pressure sensor, and/or at least one ambient temperature sensor.

In at least one embodiment, each flood monitoring station can include a relative humidity sensor and/or a rainfall sensor. In at least one embodiment, the water level can be determined at each flood monitoring station additionally using a relative humidity sensor and a rainfall sensor located at each flood monitoring station. In at least one embodiment, the water level can be determined at each flood monitoring station only when one or more of a relative humidity sensor and a rainfall sensor indicate adverse weather.

In at least one embodiment, determining the water level can be done at a first periodic rate. In at least one embodiment, communicating the most recent water level can be done wirelessly at a second periodic rate. In at least one embodiment, the first periodic rate is the same as the second periodic rate. In at least one embodiment, the first periodic rate can be less than the second periodic rate. In at least one embodiment, the first periodic rate can be greater than the second periodic rate. In at least one embodiment, warning a user of flooding can include communicating wirelessly a warning message to the user from the flood warning station. In at least one embodiment, warning the user of flooding can include triggering a visual warning at the flood monitoring station that reported the water level exceeding the threshold.

In at least one embodiment, the method for monitoring flooding can include receiving wirelessly, at the flood warning station, a confirmation message from the user. In at least one embodiment, the method for monitoring flooding can include communicating wirelessly, upon receiving the confirmation message, from the flood warning station to the flood monitoring station that reported the water level exceeding the threshold, a trigger message. In at least one embodiment, the method for monitoring flooding can include, upon receiving the trigger message, triggering a visual warning at the flood monitoring station that reported the water level exceeding the threshold.

In at least one embodiment, the method for monitoring flooding can include calculating a rate of rise of the water level at each flood monitoring station. In at least one embodiment, the method for monitoring flooding can include predicting based on a rate of rise, a relative humidity sensor, and/or a rainfall sensor whether flooding is likely to occur at each flood monitoring station. In at least one embodiment, the method for monitoring flooding can include triggering a visual warning at a flood monitoring station where and/or when flooding is likely to occur.

In at least one embodiment, a system for monitoring flooding can include a plurality of flood monitoring stations and at least one flood warning station in communication with each flood monitoring station. In at least one embodiment, each flood monitoring station can include at least one pressure transducer configured to detect water level. In at least one embodiment, each flood monitoring station can include at least one atmospheric pressure sensor. In at least one embodiment, each flood monitoring station can include at least one ambient temperature sensor. In at least one embodiment, each flood monitoring station can include a visual warning device.

In at least one embodiment, each flood monitoring station can include a processor and a wireless communications device. In at least one embodiment, the processor can be configured to determine a water level using the pressure transducer, the atmospheric pressure sensor, and the ambient temperature sensor. In at least one embodiment, the processor can be configured to communicate the water level using the wireless communication device. In at least one embodiment, the processor can be configured to control the visual warning device. In at least one embodiment, the flood warning station can be in wireless communication with the processor at each flood monitoring station through the wireless communications device at each flood monitoring station.

In at least one embodiment, each flood monitoring station can include an ambient relative humidity sensor and/or a rainfall sensor. In at least one embodiment, the processor can be configured to determine the water level using the ambient relative humidity sensor and the rainfall sensor. In at least one embodiment, the processor can be configured to determine the water level only when one or more of the ambient relative humidity sensor and the rainfall sensor indicate adverse weather.

In at least one embodiment, the processor can be configured to determine the water level periodically, such as at a first period. In at least one embodiment, the processor can be configured to communicate the water level to the flood warning station using the wireless communication device periodically, such as at a second period. In at least one embodiment, the processor can be configured to communicate the water level to the flood warning station using the wireless communication device only when the water level exceeds a threshold. In at least one embodiment, the threshold is different for each flood monitoring station.

In at least one embodiment, the system for monitoring flooding can include a web page configured to display a status of each flood monitoring station. In at least one embodiment, the status of each flood monitoring station can indicate whether or not the water level at each flood monitoring station exceeds a threshold for the flood monitoring station.

In at least one embodiment, the flood warning station can be configured to alert a user when the water level at one or more of the flood monitoring stations exceeds a threshold. In at least one embodiment, the flood warning station can be configured to cause the processor at one or more of the flood monitoring stations to trigger the visual warning device upon receiving a confirmation from the user. In at least one embodiment, the processor of each flood monitoring station can be configured to trigger the visual warning device when the water level exceeds a threshold, with or without user intervention.

In at least one embodiment, the processor of each flood monitoring station can be configured to determine a rate of rise of the water level. In at least one embodiment, the processor of each flood monitoring station can be configured to predict, based on the rate of rise, a relative humidity sensor, and a rainfall sensor whether flooding is likely to occur. In at least one embodiment, the processor of each flood monitoring station can be configured to trigger the visual warning device when the processor has determined that flooding is likely to occur.

In at least one embodiment, a method can include obtaining a water level reading with one or more flood monitoring stations, the flood monitoring station(s) including a controller, a wireless communications device in operable communication with the controller and a water level sensor in operable communication with the controller, wirelessly communicating the water level reading from a flood monitoring station to one or more flood warning stations, the flood warning station(s) including one or more displays, and displaying, on one or more displays, a visual indicator for visually indicating to a user whether the water level reading is greater than, less than or equal to a water level threshold. In at least one embodiment, a method can include wirelessly communicating at least one instruction from a flood warning station to a flood monitoring station. In at least one embodiment, a method can include wirelessly communicating at least one instruction from a flood warning station to a mobile device having a display and displaying, on the display, a visual indicator for indicating whether flooding is present in a geographical location where a flood monitoring station is located.

In at least one embodiment, a system can include one or more flood monitoring stations including a controller, a wireless communications device in operable communication with the controller and a water level sensor in operable communication with the controller, and one or more flood warning stations including one or more displays. A flood monitoring station can be configured to wirelessly communicate a water level reading from the water level sensor to a flood warning station. A flood warning station can be configured to display, on one or more displays, a visual indicator for visually indicating whether one or more water level readings are greater than, less than or equal to one or more water level thresholds. In at least one embodiment, a flood warning station can be configured to wirelessly communicate at least one instruction to a flood monitoring station. In at least one embodiment, a system can include one or more mobile devices having one or more displays, and a flood warning station can be configured to wirelessly communicate at least one instruction to one or more mobile devices, such as for causing a mobile device to display a visual indicator for indicating whether flooding is present in a geographical location where the flood monitoring station is located.

As will be appreciated by one of ordinary skill in the art having the benefits of the present disclosure, aspects of the embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present disclosure can be written in any combination of one or more programming languages, including an object oriented programming language such as Java, Smalltalk, C++, Python or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure can be and/or are described with reference to flowchart illustrations and/or block diagrams of methods, apparatus (systems) and computer program products according to embodiments of the disclosure. Each block of a flowchart illustration and/or block diagram, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer readable medium (which can be or include any non-transitory computer readable media) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other device(s) to produce a computer implemented process such that the instructions which execute on the computer or other programmable apparatus provide processes for implementing the functions/acts specified in a flowchart and/or block diagram block or blocks.

Other and further embodiments utilizing one or more aspects of the disclosure can be devised without departing from the spirit of Applicants' disclosure. For example, the devices, systems and methods can be implemented for numerous different types and sizes of flood warning arrangements, including scalable arrangements, in numerous different localities or geographical areas. As other examples, one or more devices, systems and methods of the disclosure can be configured for other sensor peripherals or implementations, whether separately or in combination with flood warning functionality. Further, the various methods and embodiments of the devices, systems and methods can be included in combination with each other to produce variations of the disclosed methods and embodiments. Discussion of singular elements can include plural elements and vice-versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the claims.

What is claimed is:

1. A method for monitoring flooding, the method comprising:

providing a plurality of flood monitoring stations, each flood monitoring station including at least one sensor configured to detect water level;
determining, at each flood monitoring station, a water level using the at least one sensor;
communicating wirelessly, from each flood monitoring station to a flood warning station, a most recent water level determined by each flood monitoring station;
communicating wirelessly a warning message to a user from the flood warning station when one or more of the most recent water levels determined by each flood monitoring station exceeds a threshold;
wherein the warning message is sent to a user device after the flood warning station receives the most recent water level determined from the flood monitoring station that reported the water level exceeding a threshold;
wherein the user device is distinct from each flood monitoring station and the flood warning station;
receiving wirelessly, at the flood warning station, a confirmation message from the user device after the warning message is sent to the user device;
communicating wirelessly, upon receiving the confirmation message from the user device, from the flood warning station to the flood monitoring station that reported the water level exceeding the threshold, a trigger message;
wherein the trigger message is sent to the flood monitoring station after the flood warning station receives the confirmation message from the user device;
triggering, upon receiving the trigger message at the flood monitoring station from the flood warning station, a visual warning at the flood monitoring station that reported the water level exceeding the threshold;
wherein each of the plurality of flood monitoring stations includes a warning light physically mounted to a flasher pole in a fixed location adjacent to a corresponding waterway, wherein the at least one sensor of each flood monitoring station is mounted within the corresponding waterway and operably coupled to a first controller disposed within a first housing, and wherein the method further comprises detecting, with the at least one sensor of each flood monitoring station, the water level of each corresponding waterway; and
wherein one or more of the plurality of flood monitoring stations includes a plurality of warning lights physically mounted to a plurality of flasher poles in fixed locations adjacent to the corresponding waterway, and wherein the method further comprises tracking, at a control panel, the flasher pole confirmation progress of each of the plurality of flasher poles.

2. The method of claim 1, wherein the water level is determined at a first periodic rate and the most recent water level is communicated at a second periodic rate, wherein the first periodic rate is the same as the second periodic rate.

3. The method of claim 1, wherein the water level is determined at each flood monitoring station additionally using a pressure transducer, an atmospheric pressure sensor, an ambient temperature sensor, a relative humidity sensor and a rainfall sensor located at each flood monitoring station.

4. The method of claim 1, wherein the water level is determined at each flood monitoring station only when one or more of a relative humidity sensor and a rainfall sensor indicate adverse weather.

5. The method of claim 1, further including:
calculating a rate of rise of the water level at each flood monitoring station;
predicting based on the rate of rise, a relative humidity sensor, and a rainfall sensor whether flooding is likely to occur at each of the flood monitoring stations; and
triggering a visual warning, when flooding is likely to occur at one or more of the flood monitoring stations, at each flood monitoring station where flooding is likely to occur.

6. The method of claim 1, wherein the first housing is a gauge box and further comprising a flasher box mounted to the flasher pole and housing a second controller operably coupled to the warning light, and wherein the method further comprises wirelessly communicating the trigger message to the second controller.

7. The method of claim 6, further comprising overriding, at the flasher box, the on/off status of the flasher pole of one or more of the plurality of flood monitoring stations.

8. The method of claim 1, further comprising displaying, on a dashboard, real-time data reflecting precipitation accumulation and rate of flood depth change at each of the plurality of flood monitoring stations.

9. The method of claim 1, wherein the flood monitoring station that reported the water level exceeding the threshold waits for the trigger message from the flood warning station before triggering the visual warning.

10. The method of claim 1, further including
receiving wirelessly, at the flood monitoring station, the confirmation message from the user;
triggering, upon receiving the confirmation message from the user, the visual warning at the flood monitoring station that reported the water level exceeding the threshold without waiting for the trigger message from the flood warning station.

11. A system for monitoring flooding, the system comprising:
a plurality of flood monitoring stations, each flood monitoring station including at least one sensor, a processor, a wireless communications device, and a visual warning device;
wherein the processor is configured to determine a water level using the sensor;
wherein the processor is configured to communicate the water level using the wireless communication device, and wherein the processor is further configured to control the visual warning device; and
at least one flood warning station in wireless communication with the processor at each flood monitoring station through the wireless communications device at each flood monitoring station, wherein the at least one flood warning station is also in wireless communication with at least one user device distinct from each of the flood monitoring stations and the at least one flood warning station;
wherein the at least one flood warning station is configured to send a warning message to the user device when any one or more of the flood monitoring stations reports a water level exceeding a threshold and to thereafter receive a confirmation message from the user device, the confirmation message authorizing the one or more flood monitoring stations to trigger its visual warning device;
wherein the at least one flood warning station is further configured to send, after receiving the confirmation message from the user device, a trigger message to the one or more flood monitoring stations that reported the water level exceeding the threshold, the trigger message triggering the one or more flood monitoring stations to trigger its visual warning device;

wherein each of the plurality of flood monitoring stations includes a warning light physically mounted to a flasher pole in a fixed location adjacent to a corresponding waterway, wherein the at least one sensor of each flood monitoring station is mounted within the corresponding waterway and operably coupled to a first controller disposed within a first housing, and wherein the system is configured to detect, with the at least one sensor of each flood monitoring station, the water level of each corresponding waterway; and wherein one or more of the plurality of flood monitoring stations includes a plurality of warning lights physically mounted to a plurality of flasher poles in fixed locations adjacent to the corresponding waterway, and wherein the system is configured to track, at a control panel, the flasher pole confirmation progress of each of the plurality of flasher poles.

12. The system of claim 11, wherein the sensor is a pressure transducer configured to detect water level, each flood monitoring station further including an atmospheric pressure sensor, an ambient temperature sensor, and an ambient relative humidity sensor and a rainfall sensor.

13. The system of claim 12, wherein the processor is further configured to determine the water level based on a signal from at least one of the ambient relative humidity sensor and the rainfall sensor.

14. The system of claim 12, wherein the processor is further configured to determine the water level only when one or more of the ambient relative humidity sensor and the rainfall sensor indicate adverse weather.

15. The system of claim 11, wherein the processor of each flood monitoring station is configured to communicate the water level to the flood warning station using the wireless communication device only when the water level exceeds the threshold.

16. The system of claim 15, wherein the threshold is different for each flood monitoring station.

17. The system of claim 11, further including a web page configured to display a status of each flood monitoring station, the status of each flood monitoring station indicating whether or not the water level at each flood monitoring station exceeds the threshold for each flood monitoring station.

18. The system of claim 11, wherein the processor of each flood monitoring station is configured to trigger the visual warning device when the water level exceeds the threshold.

19. The system of claim 11, wherein the processor of each flood monitoring station is further configured to:
determine a rate of rise of the water level;
predict based on the rate of rise, a relative humidity sensor, and a rainfall sensor whether flooding is likely to occur; and
trigger the visual warning device when the processor has determined that flooding is likely to occur.

20. The system of claim 11, wherein the processor of each flood monitoring station is further configured to wait for the trigger message from the flood warning station before triggering its visual warning device.

21. The system of claim 11, wherein the processor of each flood monitoring station is further configured to trigger its visual warning device upon receiving the confirmation message from the user device without waiting for the trigger message from the flood warning station.

22. A method for monitoring flooding, the method comprising:

providing a plurality of flood monitoring stations, each flood monitoring station including a sensor configured to detect water level and a flasher pole having a visual warning device;
determining, at each flood monitoring station, a water level using the sensor;
communicating wirelessly, from each flood monitoring station to a flood warning station, a most recent water level determined by each flood monitoring station;
communicating wirelessly, from the flood warning station to a user device, a warning message when one or more of the most recent water levels determined by each flood monitoring station exceeds a threshold;
receiving wirelessly, at the flood warning station from the user device, a confirmation message authorizing the flood monitoring station to trigger its visual warning device;
communicating wirelessly, from the flood warning station to the flood monitoring station that reported the water level exceeding the threshold, a trigger message, thereby causing the flood monitoring station that reported the water level exceeding the threshold to activate its visual warning device;
wherein the flood warning station waits for the confirmation message from the user device before sending the trigger message to the flood monitoring station that reported the water level exceeding the threshold;
wherein the flood monitoring station that reported the water level exceeding the threshold waits for the trigger message from the flood warning station before activating its visual warning device;
wherein the visual warning device of each of the plurality of flood monitoring stations includes a warning light physically mounted to the flasher pole in a fixed location adjacent to a corresponding waterway, wherein the sensor of each flood monitoring station is mounted within the corresponding waterway and operably coupled to a first controller disposed within a first housing, and wherein the method further comprises detecting, with the sensor of each flood monitoring station, the water level of each corresponding waterway; and
wherein one or more of the plurality of flood monitoring stations includes a plurality of warning lights physically mounted to a plurality of flasher poles in fixed locations adjacent to the corresponding waterway, and wherein the method further comprises tracking, at a control panel, the flasher pole confirmation progress of each of the plurality of flasher poles.

23. A method for monitoring flooding, the method comprising:
providing a plurality of flood monitoring stations, each flood monitoring station including at least one sensor configured to detect water level, wherein each flood monitoring station is physically mounted adjacent an intersection of a roadway and a corresponding waterway, and wherein the at least one sensor configured to detect water level is mounted within the corresponding waterway at an elevation lower than the roadway;
determining, at each flood monitoring station, a water level of the corresponding waterway using the at least one sensor;
communicating wirelessly, from each flood monitoring station to a flood warning station remote from the flood monitoring stations, a most recent water level determined by each flood monitoring station;

communicating wirelessly a warning message, from the flood warning station to a controlling user remote from the flood monitoring stations, after one or more of the most recent water levels determined by each flood monitoring station exceeds a threshold;

receiving wirelessly, at the flood warning station, a confirmation message from the controlling user, the confirmation message from the controlling user being in response to the warning message;

communicating wirelessly, after receiving the confirmation message at the flood warning station, from the flood warning station to the flood monitoring station that reported the water level exceeding the threshold, a trigger message;

triggering, after receiving the trigger message at the flood monitoring station, a visual warning at the flood monitoring station that reported the water level exceeding the threshold, the visual warning providing indication to drivers in the vicinity of the roadway that the water level of the corresponding waterway is above the roadway;

wherein each of the plurality of flood monitoring stations includes a warning light physically mounted to a flasher pole in a fixed location adjacent to the corresponding waterway, wherein the at least one sensor of each flood monitoring station is operably coupled to a first controller disposed within a first housing, and wherein the method further comprises detecting, with the at least one sensor of each flood monitoring station, the water level of each corresponding waterway; and wherein one or more of the plurality of flood monitoring stations includes a plurality of warning lights physically mounted to a plurality of flasher poles in fixed locations adjacent to the corresponding waterway, and wherein the method further comprises tracking, at a control panel, the flasher pole confirmation progress of each of the plurality of flasher poles.

* * * * *